(12) United States Patent  
Lerch et al.

(10) Patent No.: US 11,200,557 B2  
(45) Date of Patent: Dec. 14, 2021

(54) SCALABLE WIRELESS TRANSACTION SYSTEM

(71) Applicant: Apple Inc., Cupertino, CA (US)

(72) Inventors: Matthias Lerch, San Francisco, CA (US); Ahmer A. Khan, Milpitas, CA (US); Oren M. Elrad, San Francisco, CA (US); Franck Rakotomalala, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 9 days.

(21) Appl. No.: 16/427,194

(22) Filed: May 30, 2019

(65) Prior Publication Data

US 2019/0370778 A1 Dec. 5, 2019

Related U.S. Application Data

(60) Provisional application No. 62/679,730, filed on Jun. 1, 2018.

(51) Int. Cl.
*G06Q 20/32* (2012.01)
*H04L 29/06* (2006.01)

(52) U.S. Cl.
CPC ....... *G06Q 20/3227* (2013.01); *H04L 63/102* (2013.01)

(58) Field of Classification Search
CPC .................................................. G06Q 20/3227
(Continued)

(56) References Cited

U.S. PATENT DOCUMENTS

| 7,980,458 B2* | 7/2011 | Kon ........................ G06Q 20/10 235/375 |
| 8,011,588 B2* | 9/2011 | Kon ........................ G07F 7/0873 235/486 |

(Continued)

FOREIGN PATENT DOCUMENTS

| JP | 2009-053766 | 3/2009 |
| JP | 2015-022486 | 2/2015 |

(Continued)

OTHER PUBLICATIONS

Extended European Search Report from European Patent Application No. 19177637.6 dated Nov. 27, 2019, 4 pages.

(Continued)

*Primary Examiner* — Alexander G Kalinowski  
*Assistant Examiner* — Paul R Kloberg  
(74) *Attorney, Agent, or Firm* — Morgan, Lewis & Bockius LLP

(57) ABSTRACT

A device implementing a scalable wireless transaction system includes at least one processor configured to receive, from a wireless transaction system server, a list of wireless transaction group identifiers, and an indication of at least one applet associated with each of the wireless transaction group identifiers. The at least one processor is further configured to receive, from a wireless transaction device, a polling frame that includes one of the wireless transaction device group identifiers. The at least one processor is further configured to select an applet provisioned on a device secure element that is assigned to the wireless transaction group identifier, the assigning being based at least in part on the received list. The at least one processor is further configured to utilize the selected applet to perform a wireless transaction with the wireless transaction device.

20 Claims, 17 Drawing Sheets

(58) Field of Classification Search
USPC .......................................................... 705/44
See application file for complete search history.

(56) References Cited

U.S. PATENT DOCUMENTS

| | | | |
|---|---|---|---|
| 8,886,176 B2* | 11/2014 | Luna | H04L 67/2833 |
| | | | 455/422.1 |
| 9,420,403 B1* | 8/2016 | Annan | H04W 4/80 |
| 10,762,489 B2* | 9/2020 | Koeppel | G06Q 20/341 |
| 2007/0150608 A1* | 6/2007 | Randall | H04L 67/26 |
| | | | 709/228 |
| 2009/0050686 A1* | 2/2009 | Kon | G06Q 20/363 |
| | | | 235/375 |
| 2015/0019418 A1 | 1/2015 | Hotard et al. | |
| 2018/0068301 A1 | 3/2018 | Abdulrahiman | |
| 2018/0082288 A1 | 3/2018 | Chester et al. | |

FOREIGN PATENT DOCUMENTS

| | | |
|---|---|---|
| JP | 2016-504690 | 2/2016 |
| JP | 2017-021443 | 1/2017 |
| JP | 2017-533528 | 11/2017 |
| KR | 2015-0114765 | 10/2015 |

OTHER PUBLICATIONS

European Office Action from European Patent Application No. 19177637.6 dated Jan. 23, 2020, 6 pages.

Japanese Office Action from Japanese Patent Application No. 2019-102615, dated Aug. 20, 2020, 7 pages including English language translation.

Korean Office Action from Korean Patent Application No. 10-2019-0064751, dated Nov. 16, 2020, 24 pages including machine-generated translation.

Korean Office Action from Korean Patent Application No. 10-2019-0064751, dated Apr. 26, 2021, 9 pages including English language translation.

Japanese Office Action from Japanese Patent Application No. 2019-102615, dated Mar. 4, 2020, 4 pages including English language translation.

Korean Office Action from Korean Patent Application No. 10-2019-0064751, dated Jul. 13, 2021, 9 pages including English language translation.

\* cited by examiner

500

| BYTE 4 | BYTE 5 | BYTE 6 |
|---|---|---|
| CAMPUS || TERMINAL GROUP |

CAMPUS TCI

CAMPUS:

- '00' = NOT USED
- '01' = UNIVERSITY 1
- '02' = UNIVERSITY 2
- ETC.

TERMINAL GROUP:

- '00' = STANDARD
- '01' = ALSO ACCEPTS LOCAL LIBRARY CARD
- '02' = ALSO ACCEPTS LOCAL TRANSIT CARD
- ETC.

| BYTE 4 | BYTE 5 | BYTE 6 |
|---|---|---|
| MANUFACTURER | | READER IDENTIFICATION |

MOBILE TCI

MANUFACTURER:

- '00 00' = NOT DEFINED
- '01 00' = MANUFACTURER 1
- '02 00' = MANUFACTURER 2
- '03 00' = MANUFACTURER 3
- '04 00' = MANUFACTURER 4
- '05 00' = MANUFACTURER 5
- ETC.

READER IDENTIFICATION

- '00' = STANDARD/DON'T CARE
- '01' = LOCATION A
- '02' = LOCATION B
- '03' = LOCATION C
- '04' = LOCATION D

| BYTE 1 | BYTE 2 | BYTE 3 | BYTE 4 | BYTE 5 |
|---|---|---|---|---|
| WORLDWIDE SCHEMES ||| LOCAL SCHEMES ||
| OPEN LOOP TCI |||||

OPEN LOOP TRANSIT TCI

| TCI | INTERNATIONAL SCHEMES |
|---|---|
| '00 00 00' | NONE |
| '00 00 01' | INT'L SCHEME 1 |
| '00 00 02' | INT'L SCHEME 2 |
| '00 00 03' | INT'L SCHEME 3 |
| '00 00 04' | INT'L SCHEME 1, INT'L SCHEME 2 (NO PRIORITY ORDERING) |
| '00 00 05' | INT'L SCHEME 1, INT'L SCHEME 3 |
| '00 00 07' | INT'L SCHEME 2, INT'L SCHEME 3 |
| '00 00 08' | INT'L SCHEME 1, INT'L SCHEME 2, INT'L SCHEME 3 |

| TCI | LOCAL SCHEMES |
|---|---|
| '00 00' | NONE |
| '00 01' | LOCAL SCHEME 1 |
| '00 02' | LOCAL SCHEME 2 |
| '00 03' | LOCAL SCHEME 3 |

TCI LIST

| TCI | AID | PRIORITY |
|---|---|---|
| TCI 1 | AID 1A=AID 1 (FROM UPL) | 1 |
| | AID 1B = AID 4 | 2 |
| TCI 2 | AID 2A = AID 3 | 1 |
| | AID 2B = NOT PRESENT IN WALLET | 2 |
| | AID 2C = AID 2 | 3 |
| TCI 3 | AID 3A = AID 4 | 1 |
| | AID 3B = AID 3 | 1 |

802

USER CONFIGURED PRIORITY LIST (UPL):

| AID | PRIORITY |
|---|---|
| AID 1 | 1 |
| AID 2 | 3 |
| AID 3 | 3 |
| AID 4 | 4 |

804

SECURE ELEMENT EXPRESS CONFIGURATION DATA STRUCTURE

| TCI | AID |
|---|---|
| TCI 1 | AID 1 |
| TCI 2 | AID 3 |
| TCI 3 | AID 3 |

*FIG. 8*

| BYTE 3 | TRANSIT | | | ACCESS | | |
|---|---|---|---|---|---|---|
| BYTE 4 | STANDARD | | STANDARD | MOBILE | CAMPUS |
| TCI TYPE | CLOSED LOOP | OPEN LOOP | N/A | N/A | N/A |
| FIRST TCI | TCI1/AID1 | TCI2/AID2 | TCI3/AID3 | TCI4/AID4 | - |
| SECOND TCI | TCI5/AID5 | TCI6/AID6 | - | TCI7/AID7 | - |
| THIRD TCI | - | TCI8/AID6 | - | TCI9/AID8 | - |

SECURE ELEMENT EXPRESS CONFIGURATION LIST

*FIG. 9*

ECP FRAME CONFIGURATION

| S | '6A' | BYTE 1 | BYTE 2 | BYTE 3 | BYTE 4 | BYTE 5 | BYTE 6 | BYTE 7 | CRC_A | E |
|---|------|--------|--------------------|------------------|---------------------|--------|--------|--------|-------|---|
| - | '6A' | '02'   | TERMINAL INFO      | TERMINAL TYPE    | TERMINAL SUBTYPE    | TCI (1)| TCI (2)| TCI (3)| -     | - |

MOBILE ECP FRAME

| S | '6A' | BYTE 1 | BYTE 2 | BYTE 3 | BYTE 4 | BYTE 5 | BYTE 6 | BYTE 7 | CRC_A | E |
|---|------|--------|--------|--------|--------|--------|--------|--------|-------|---|
| - | '6A' | '02' | TERMINAL INFO | ACCESS | MOBILE | MOBILE TCI | | | - | - |

ISO 14443-3 STANDARD FRAME

1300

BYTE 1 - FORMAT VERSION: '02'
BYTE 2 - TERMINAL INFO: '43'
BYTE 3 - ACCESS: '02'
BYTE 4 - MOBILE: '01'
BYTE 5 - MOBILE TCI: '01'
BYTE 6 - MOBILE TCI: '00'
BYTE 7 - MOBILE TCI: 'XX'

THE VALUE OF 'XX' DEPENDS ON THE PURPOSE/LOCATION OF THE READER WITHIN THE DEVICE.

THE FOLLOWING CODING SHOULD APPLY:

- '00' = STANDARD/DON'T CARE
- '01' = LOCATION A
- '02' = LOCATION B
- '03' = LOCATION C
- '04' = LOCATION D

*FIG. 13*

SCALABLE WIRELESS TRANSACTION SYSTEM

CROSS-REFERENCE TO RELATED APPLICATIONS

The present application claims the benefit of U.S. Provisional Patent Application Ser. No. 62/679,730, entitled "Scalable Wireless Transaction System," filed on Jun. 1, 2018, which is hereby incorporated by reference in its entirety for all purposes.

TECHNICAL FIELD

The present description relates generally to a wireless (e.g., contactless) transaction system, including a scalable wireless transaction system.

BACKGROUND

In a wireless transaction system, an applet provisioned on a secure element of an electronic device may correspond to a credential or card account, such as a credit or debit card account. The applet may be used by the electronic device to engage in a wireless transaction with, e.g., a wireless transaction terminal.

BRIEF DESCRIPTION OF THE DRAWINGS

Certain features of the subject technology are set forth in the appended claims. However, for purpose of explanation, several embodiments of the subject technology are set forth in the following figures.

FIG. 5 illustrates an example format of a wireless transaction device group identifier for wireless transaction devices included in and/or coupled to access devices in accordance with one or more implementations.

FIG. 6 illustrates an example format of a wireless transaction device group identifier for wireless transaction devices included in and/or coupled to mobile and/or automotive devices in accordance with one or more implementations.

FIG. 7 illustrates an example format of a wireless transaction device group identifier for wireless transit transaction devices in accordance with one or more implementations.

FIG. 8 illustrates example data structures used in a scalable wireless transaction system in accordance with one or more implementations.

FIG. 9 illustrates example secure element express configuration lists in accordance with one or more implementations.

FIG. 12 illustrates an example enhanced contactless polling frame format in accordance with one or more implementations.

FIG. 13 illustrates an example enhanced contactless polling frame format for wireless transaction devices included in and/or coupled to mobile and/or automotive devices in accordance with one or more implementations.

DETAILED DESCRIPTION

Figure 1:
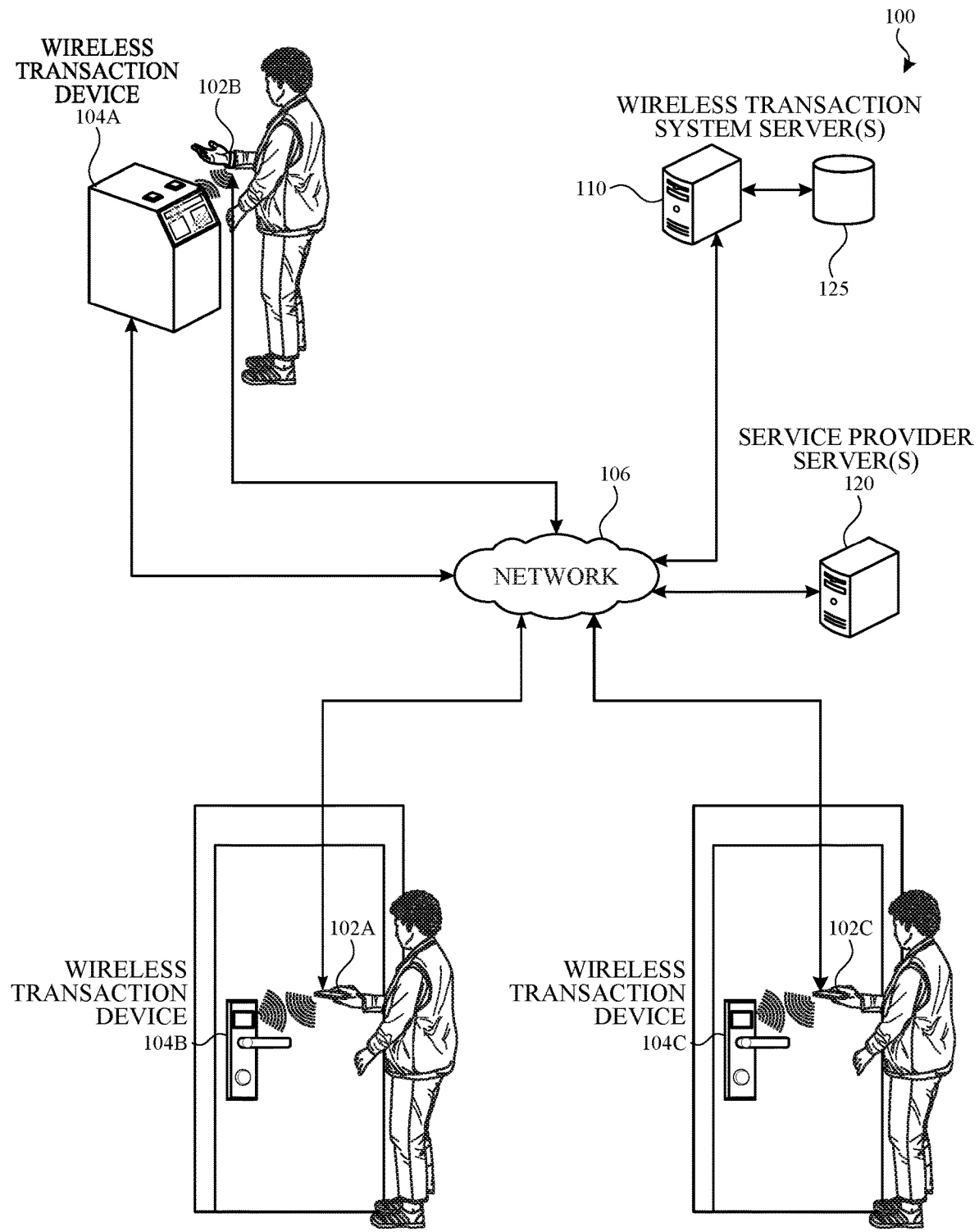
FIG. 1 illustrates an example network environment in which a scalable wireless transaction system may be implemented in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more implementations. In one or more implementations, structures and components are shown in block diagram form in order to avoid obscuring the concepts of the subject technology.

In a wireless (e.g., contactless) transaction system, in addition to the aforementioned payment applets that correspond to credit card and/or debit card accounts, one or more stored value payment applets that correspond to a stored value card (or "truth on card" or "actual cash value" (ACV) card), such as a transit card or other such prepaid card, may be provisioned on a secure element of an electronic device. In addition, one or more applets provisioned on the secure element, and/or NFC instruments or credentials hosted on a host processor, may correspond to: access cards, such as for security door access, vehicle control/access, such as car control, boat control, etc., loyalty cards, tickets (e.g., for travel and/or to events), multifunction cards (such as a school or institution identification that can be utilized for access, identification, and/or payments), and the like. It is also noted that throughout this disclosure, the term card may be used by way of example to refer to a credential issued by an entity, e.g., a bank, credit provider, commercial entity, institution, etc.

Although applets corresponding to access cards, vehicle control, loyalty cards, etc., may not involve a payment transaction like a credit card, debit card, or stored value card, the use of these applets to perform an action, such as open a door, start a vehicle, provide a loyalty number, etc. may be considered wireless transactions, where the performance of the action is analogous to providing the payment in a payment transaction. Further, some applets corresponding to multifunction credentials, such as a university/school/corporate/institutional identification credential, can be used directly or indirectly to perform payment transactions as well as other functions. For example, a multifunction credential can serve as an identification/access credential when presented to an access/security wireless terminal and serve as a payment credential when presented to a commerce (e.g., bookstore, café) wireless terminal. Thus, the wireless terminals (or readers) associated with vehicles, access doors, autonomous systems, control systems, etc. may be referred to herein as wireless transaction devices, a term which may also be used to refer to, for example, wireless payment terminals, wireless transit terminals, or generally any wireless terminal or reader.

When using different applets on the secure element to perform these different wireless transactions and/or different NFC instruments hosted on the host processor, it may be desirable to designate a particular applet (e.g. an express applet) that is automatically presented by the secure element (or electronic device) for a particular wireless transaction device, or a particular group of wireless transaction devices, e.g. without requesting that a user specifically select the applet and/or without requesting user authentication. For example, for an applet corresponding to an access/identification card that, e.g., opens a security door, it may be desirable to have the secure element automatically present the applet when a wireless transaction device associated with the security door is detected. Similarly, for an applet that corresponds to a loyalty card, e.g., for a particular retailer, it may be desirable to have the secure element automatically present the applet when a wireless transaction device associated with the particular retailer is detected. However, in order for the secure element to be able to select and present the appropriate applet to a particular wireless transaction device, the secure element needs to be able to accurately identify the particular wireless transaction device (and/or wireless transaction device group) as well as have knowledge of which applet should be presented to the wireless transaction device when detected.

The subject scalable wireless transaction system assigns wireless transaction group identifiers to each group of wireless transaction devices for each service provider. A group of wireless transaction devices may be one or more devices that accept/support the same applets and/or optionally share a common applet prioritization scheme. The subject system may provide electronic devices that utilize the wireless transaction system with a list of the wireless transaction device group identifiers in conjunction with an indication of the one or more applets that are accepted by each of the corresponding wireless transaction device groups and/or any applet prioritization schemes associated therewith.

The subject system further utilizes a polling frame, which may be referred to as an enhanced contactless polling (ECP) frame, that is transmitted by a wireless transaction device to a proximate electronic device (e.g., having a secure element) during a polling loop. The polling frame may include the wireless transaction device group identifier assigned to the wireless transaction device. The electronic device receiving the polling frame may retrieve the previously received list of applets that are accepted by the corresponding wireless transaction device group and may select one of the listed applets that is stored on the electronic device and/or secure element to present to the wireless transaction device, e.g. without requesting user input and/or user authentication. In one or more implementations, the electronic device may select the applet to present to each wireless transaction device group based on user configured priorities for the applets as well as any applet prioritization scheme indicated in the list of wireless transaction device group identifiers.

Thus, the subject system enables electronic devices to automatically present the appropriate applet for each detected wireless transaction device. In addition, the subject system provides a scalable platform that allows for adding additional (e.g., subsequently created) wireless transaction devices to the wireless transaction system, while also allowing service providers to modify existing wireless transaction device groups, e.g., to change the list of applets accepted by a given wireless transaction device group, to change the applet prioritization scheme utilized by a given wireless transaction device group and/or to change the wireless transaction devices including the wireless transaction device group.

FIG. 1 illustrates an example network environment 100 in which a scalable wireless transaction system may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes one or more electronic devices 102A-C, one or more wireless transaction devices 104A-C, a network 106, one or more wireless transaction system servers 110, a wireless transaction system data store 125, and one or more service provider servers 120.

The network 106 may communicatively couple, for example, one or more of the wireless transaction devices 104A-C to the one or more service provider servers 120 and/or the one or more wireless transaction system servers 110, one or more of the electronic devices 102A-C to the one or more wireless transaction system servers 110 and/or the one or more service provider servers 120, and the one or more wireless transaction system servers 110 to the one or more service provider servers 120.

One or more of the electronic devices 102A-C may communicate with one or more of the wireless transaction devices 104A-C via a direct communication, such as a near field communication (NFC), that bypasses the network 106. In one or more implementations, one or more of the electronic devices 102A-C may communicate with one or more of the wireless transaction devices 104A-C over the network 106 and/or one or more of the wireless transaction devices 104A-C may not be communicatively coupled to the network 106, such as the wireless transaction devices 104B-C in FIG. 1. In one or more implementations, the network 106 may be an interconnected network of devices that may include, or may be communicatively coupled to, the Internet.

The wireless transaction devices 104A-C may be, for example, wireless transit transaction devices, wireless toll transaction devices, wireless parking meter transaction devices, wireless point of sale transaction devices, wireless mobile devices, wireless transaction devices included in and/or coupled to access devices, such as doors, locks, etc., wireless transaction devices included in and/or coupled to automotive/vehicle devices, and/or any devices that include one or more wireless interfaces that may be used to perform a wireless transaction, such as NFC radios, wireless local area network (WLAN) radios, Bluetooth radios, Zigbee radios, cellular radios, and/or other wireless radios. In FIG. 1, by way of example, the wireless transaction device 104A is depicted as a wireless transit transaction device, and the wireless transaction devices 104B-C are depicted as wireless transaction devices included in and/or coupled to an access device, such as a door lock. In one or more implementations, one or more of the wireless transaction devices 104A-C may be a wireless transaction device included in and/or coupled to a vehicle. One or more of the wireless transaction devices 104A-C may be, and/or may include all or part of, the electronic system discussed below with respect to FIG. 17.

The one or more wireless transaction system servers 110 may include one or more servers that facilitate providing a wireless transaction system to one or more electronic devices 102A-C in conjunction with the one or more service provider servers 120 and/or the wireless transaction devices 104A-C. As is discussed further below with respect to FIG. 2, the one or more wireless transaction system servers 110 may include one or more trusted services manager (TSM) servers, one or more broker servers, one or more application servers, and/or generally any servers that may facilitate providing a wireless transaction system. In one or more implementations, authorized users of the electronic devices 102A-C may have respective user accounts with the wireless transaction system. The user accounts may be used to manage the various cards and/or credentials that the user has registered with the wireless transaction system, e.g., via the one or more wireless transaction system servers 110. The one or more wireless transaction system servers 110 may be, and/or may include all or part of, the electronic system discussed below with respect to FIG. 17.

The one or more service provider servers 120 may include one or more server devices that may be associated with one or more service providers, such as service providers corresponding to the wireless transaction devices 104A-C. For example, the one or more service provider servers 120 may transmit polling frame configuration information to one or more of the wireless transaction devices 104A-C, and/or may facilitate pre-configuring one or more of the wireless transaction devices 104A-C with appropriate polling frame information. The polling frame information may, for example, be provided to the one or more service provider servers 120 by the one or more wireless transaction system servers 110, as is discussed further below with respect to FIGS. 4 and 14. In one or more implementations, the one or more service provider servers 120 may facilitate a service being provided, such as a transit service, and/or may facilitate utilizing wireless transactions for the service being provided.

The one or more service provider servers 120 may include one or more TSM servers, one or more broker servers, one or more application servers, or generally any servers that may facilitate providing a service and/or utilizing wireless transactions for the service. In one or more implementations, an authorized user of the electronic device 102A and/or the electronic device 102B may have a user account with one or more service providers associated with the one or more service provider servers 120. The user account may be used by the user to access the wireless transactions (e.g., a historical record) via the electronic device 102A and/or the electronic device 102B. The one or more service provider servers 120 may be, and/or may include all or part of, the electronic system discussed below with respect to FIG. 17.

A service provider corresponding to one or more of the service provider servers 120 may be, for example, a financial institution that issues credit and/or debit cards, a transit provider, a manufacturer of access devices, such as doors, locks, and the like, and/or an entity that utilizes access devices, such as a company, a school, etc., a manufacturer of vehicles, such as automotives, a retailer that provides loyalty card accounts, a ticketing service provider that provides tickets to events, a travel service provider that provides tickets for travel, such as an airlines, or generally any service provider that may provide a virtual or physical pass, ticket, card, or the like to users.

The electronic devices 102A-C may be, for example, portable computing devices such as laptop computers, smartphones, peripheral devices (e.g., digital cameras, headphones), tablet devices, wearable devices (e.g., watches, bands, etc.), or other appropriate devices that include one or more wireless interfaces, such as one or more NFC radios, WLAN radios, Bluetooth radios, Zigbee radios, cellular radios, and/or other wireless radios. In FIG. 1, by way of example, the electronic devices 102A,C are depicted as mobile devices and the electronic device 102B is depicted as a smartwatch. One or more of the electronic devices 102A-C may be, and/or may include all or part of, the electronic device discussed below with respect to FIGS. 2 and 3, and/or the electronic system discussed below with respect to FIG. 17.

In one or more implementations, one or more of the electronic devices 102A-C may include a secure element onto which one or more applets may be provisioned. An example electronic device 102A that includes a secure element is discussed further below with respect to FIG. 2, and an example secure element is discussed further below with respect to FIG. 3.

When a user requests that an applet corresponding to a particular service provider be provisioned on the secure element of an electronic device, such as the electronic device 102A, one or more of the service provider servers 120 and/or the one or more wireless transaction system servers 110, such as a TSM server and/or a broker server, may cause the applet for the service provider to be provisioned on a secure element of the electronic device 102A, such as by transmitting a provisioning script to be executed by the secure element of the electronic device 102A.

The applet may be provisioned on the secure element with an applet identifier (AID) and/or one or more attributes, such as any/all of an attribute indicating whether authentication is required to utilize the applet, an attribute indicating whether the authentication required attribute is locally configurable, e.g., without facilitation from a TSM server, and/or an attributes specific to the type of applet, such as an attribute storing an amount of the monetary value associated with a stored value payment applet. The applet identifier may be a unique identifier relative to the other applets provisioned on the secure element (and/or may be a globally unique identifier) and the applet identifier may be used to identify the applet.

In one or more implementations, the applet may be provisioned with one or more wireless transaction device group identifiers that indicate the wireless transaction device groups that accept/support the applet. Similarly, one or more host processor backed NFC instruments or credentials may also be provisioned with one or more wireless transaction device group identifiers that indicate the wireless transaction device groups that accept/support the NFC instruments or credentials. The wireless transaction device group identifiers may be provided by the one or more service provider servers 120 providing the applet, and/or may be appended to the applet by the one or more wireless transaction system servers 110 before the applet is provisioned on the secure element of the electronic device 102A.

When the applet is provisioned with an attribute indicating that authentication is not required to utilize the applet, applet may be configured as an express applet, e.g. for a particular service provider. An applet that is configured as an express applet may be used in wireless transactions with wireless transaction devices 104A-C, without having to authenticate with, or provide other input to, the electronic device 102A. Thus, when utilizing an NFC-based wireless transaction, the user may place their electronic device 102A on, or in close proximity to (e.g., within approximately 4-20 centimeters), one or more of the wireless transaction devices 104A-C to perform a wireless transaction using the express applet and/or express NFC instrument hosted on the host processor for the corresponding service provider without authenticating. Thus, the electronic device 102A, configured with an express applet and/or express NFC instrument hosted on the host processor, can be used to complete a wireless transaction—e.g., a contactless transaction—with one or more of the wireless transaction devices 104A-C without the electronic device 102A first having to receive input, such as authentication input or an unlock command.

For example, when the electronic device 102A is in close proximity to the wireless transaction devices 104A, the electronic device 102A may detect one or more polling signals transmitted by the wireless transaction device 104A, as is discussed further below with respect to FIGS. 10 and 11. The electronic device 102A may obtain a polling frame included in the polling signals to determine that the wireless transaction device 104A accepts/supports one of the express applets provisioned on the secure element, and the electronic device 102A may then cause the wireless transaction to be performed using the corresponding express applet.

In one or more implementations, the electronic device 102A may have previously received, from the one or more wireless transaction system servers 110, a list of wireless transaction device group identifiers and corresponding applets that are accepted/supported by the wireless transaction device groups, as is discussed further below with respect to FIG. 14. The polling frame later received from the wireless transaction device 104A may include one of the wireless transaction group device identifiers included in the list. Thus, the electronic device 102A may select an express applet that coincides with one of the applets accepted/supported by the wireless transaction device 104A, e.g., as indicated in the list received from the one or more wireless transaction system servers 110. An example process of using an express applet in a wireless transaction is discussed further below with respect to FIG. 16.

In one or more implementations, only one applet per wireless transaction device group identifier may be designated as an express applet on the secure element of the electronic device 102A. However, if there are multiple applets provisioned on the secure element of the electronic device 102A that are accepted by a given wireless transaction device group, the applet designated as the express applet for the wireless transaction device group can be changed automatically and/or through user input. For example, a user may configure a user priority list indicating the user's preferences with respect to the applets provisioned on the secure element of the electronic device 102A, as is discussed further below with respect to FIG. 8.

The electronic device 102A may utilize the user configured priority list, in conjunction with any priorities specified in the list received from the one or more wireless transaction system servers 110, to select one of the applets to be the express applet for the wireless transaction device group. An example process for selecting the appropriate applet for a given wireless transaction device group based on a user configured priority list and/or any priorities specified in the list received from the one or more wireless transaction system servers 110 is discussed further below with respect to FIG. 15.

Accordingly, the subject system can unambiguously identify the applets accepted by any given wireless transaction device (e.g. terminal), independent of any radio frequency (RF) technology related principles. This application-level identification allows the NFC controller to activate, in collaboration with the secure element (e.g., in real time) and host processor and/or server (at provisioning time), the appropriate applet for any given wireless transaction device.

Figure 2:
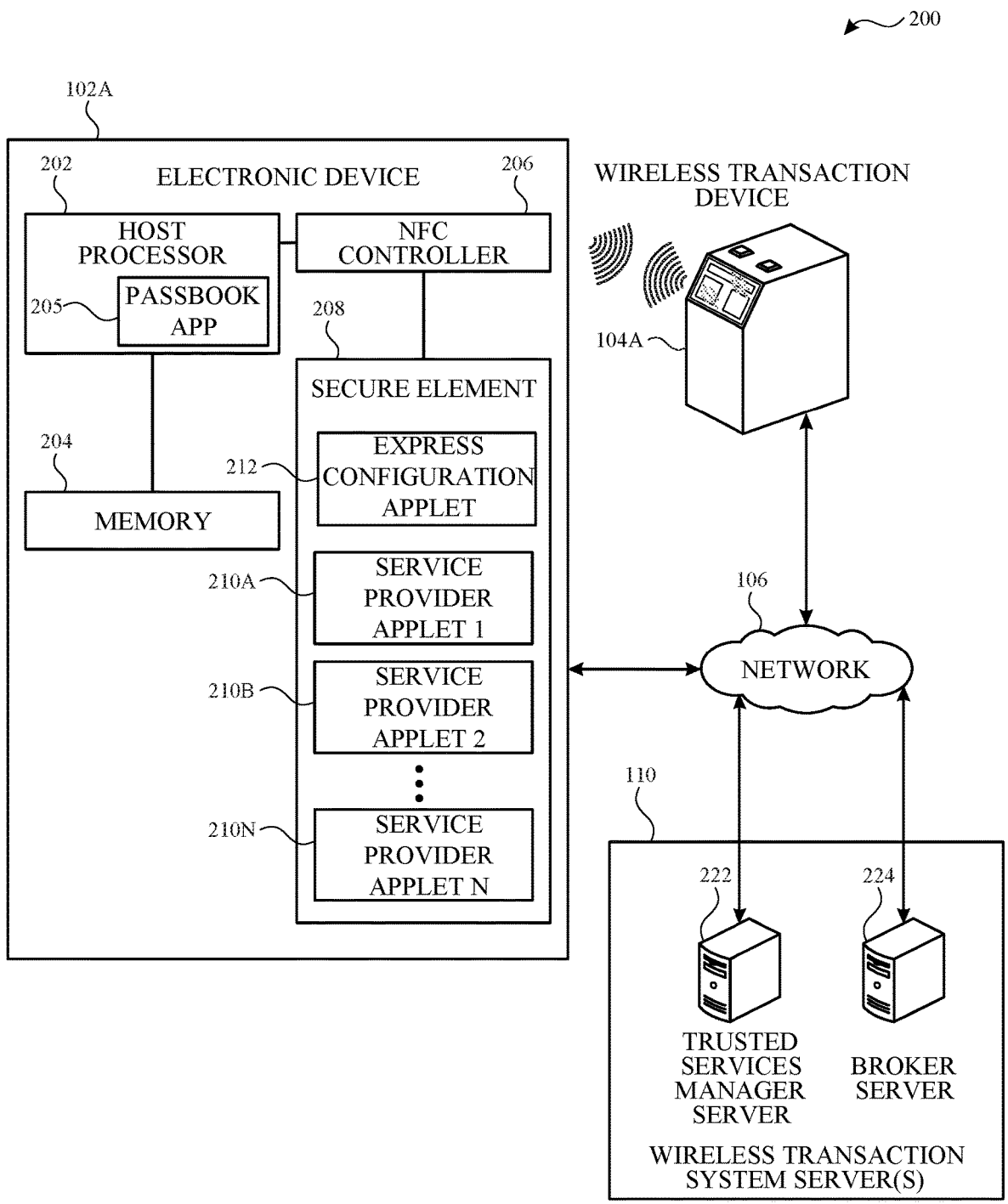
FIG. 2 illustrates an example network environment including an example electronic device that may be used in a scalable wireless transaction system in accordance with one or more implementations.

FIG. 2 illustrates an example network environment including an example electronic device 102A that may be used in a scalable wireless transaction system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. In one or more implementations, one or more components of the example electronic device 102A may be implemented by one or more of the electronic devices 102B-C.

The example network environment 200 may include the electronic device 102A, the wireless transaction device 104A, the network 106, and the one or more wireless transaction system servers 110. The one or more wireless transaction system servers 110 may include a trusted services manager (TSM) server 222 and a broker server 224. The electronic device 102A may include a host processor 202, a memory 204, an NFC controller 206, and a secure element 208.

The secure element 208 may include one or more interfaces for communicatively coupling (directly or indirectly) to the NFC controller 206 and/or the host processor 202, such as via one or more single wire protocol (SWP) connections and/or any other data connection. The secure element 208 may include an express configuration applet 212, and one or more service provider applets 210A-N, which may be referred to herein as applets 210A-N. In one or more implementations, the operating system and/or execution environment of the secure element 208 may be a JAVA-based operating system and/or JAVA-based execution environment, and the applets 210A-N, 212 may be JAVA-based applets. In other implementations, other operating systems, languages, and/or environments can be implemented. In addition to the one or more applets 210A-N, 212, the secure element 208 may also include one or more additional applets for performing other operations, such as a security applet, a registry applet, and the like.

The applets 210A-N, 212 may be provisioned on the secure element 208 in part by, for example, the trusted services manager server 222 and/or the broker server 224. For example, the trusted services manager server 222 and/or the broker server 224 may transmit a provisioning script to the electronic device 102A via the network 106. In some implementations, the host processor 202 of the electronic device 102A may receive the script and may provide the script to the secure element 208, such as via the NFC controller 206 and/or directly to the secure element 208. The secure element 208 may perform one or more security mechanisms to verify the received script, such as one or more security mechanisms inherent in the GlobalPlatform framework, and may then execute the received script.

The execution of the script by the secure element 208 may cause one or more of the applets 210A-N, 212 to be provisioned on the secure element 208. Each of the applets 210A-N may be provisioned with one or more of: an applet identifier, a device primary account number (DPAN) identifier, an identifier of the associated service provider, and/or one or more attributes. The applet identifier associated with a given applet 210A may be used by, for example, the host processor 202 and/or the trusted services manager server 222 to uniquely identify the applet 210A relative to the other applets 210B-N provisioned on the secure element 208, such as to perform one or more operations with respect to the applet 210A, and/or to select the applet 210A for use in a wireless transaction, such as with the wireless transaction device 104A. In one or more implementations, the applet identifiers may be used by the host processor 202 to store associations between the applets 210A-N and the corresponding service providers and/or wireless transaction device groups.

In this instance where the attributes of a given applet 210A include a DPAN, the DPAN may be associated with a card account, such as a credit card account or debit card account, that is associated with the given applet 210A. In contrast to the DPAN, the actual number that is printed on the physical card may be referred to as a funding primary account number (FPAN). When conducting a wireless transaction (e.g., a payment) using one of the applets 210A-N, the secure element 208 may provide the DPAN to a wireless transaction device 104A (e.g., without providing the FPAN which may not be stored on the secure element 208). The wireless transaction device 104A may then forward the DPAN to the associated service provider who can determine the account (e.g., the FPAN) associated with the DPAN, and confirm that the account contains sufficient funds and/or credit to complete the wireless payment transaction. In one or more implementations, the DPAN may be associated with a card account that is associated with a given applet 210A, but there may not be a physical card corresponding to the DPAN.

Among others, the one or more attributes provisioned with one or more of the applets 210A-N may include, for example, an authentication required attribute that indicates whether authentication is required to utilize the applet for wireless transactions, and an authentication configurable attribute that indicates whether the authentication required attribute is locally configurable, such as via a command from the host processor 202 without involving the trusted services manager server 222. Allowing the authentication required attribute to be locally configurable may allow a user to activate an express applet when the electronic device 102A is offline and therefore the trusted services manager server 222 and/or the broker server 224 are not accessible.

The applets 210A-N may each initially be provisioned with the authentication required attribute set to "off" or "no" (or "0"), and the authentication configurable attribute set to "yes" or "on" (or "1"), such that one or more of the applets 210A-N, such as the applet 210A, can be automatically, e.g. without user authentication, designated as an express applet for a given service provider when one or more conditions are satisfied. However, when the one or more conditions are not satisfied, the authentication required attributes of the applets 210A-N may be changed to "on" or "yes" immediately after provisioning, such that only one applets 210A-N per service provider has the authentication required attribute set to "off" or "no."

In one or more implementations, the applets 210A-N may also be provisioned with an attribute that indicates the type of communication protocol used by the applets 210A-N to communicate with the wireless transaction device 104A. The types of communication protocols may include, for example, an NFC-A protocol (or Type A), an NFC-B protocol (or Type B), an NFC-F protocol (or Type F or FeliCA), a Bluetooth protocol, a Bluetooth low energy (BLE) protocol, a Zigbee protocol, a Wi-Fi protocol, or generally any communication protocol. In one or more implementations, one or more of the communication protocols may be supported by a second secure element (not shown) that is logically presented to the electronic device 102A (e.g., in conjunction with the secure element 208) as a single secure element.

The NFC controller 206 may include one or more antennas and one or more transceivers for transmitting/receiving NFC communications. The NFC controller 206 may further include one or more interfaces, such as a single wire protocol interface, for coupling to the host processor 202 and/or the secure element 208. The NFC controller 206 may be able to communicate via one or more different NFC communication protocols, such as NFC-A (or Type A), NFC-B (or Type B), NFC-F (or Type F or FeliCA), and/or International Organization for Standardization (ISO)/International Electrotechnical Commission (IEC) 15693. The NFC-A protocol may be based on ISO/IEC 14443A and, e.g., may use Miller bit coding with a 100 percent amplitude modulation. The NFC-B protocol may be based on ISO/IEC 14443B and, e.g., may use variations of Manchester encoding along with a 10 percent modulation. The NFC-F protocol may be based on FeliCA JIS X6319-4 and, e.g., may use a slightly different variation of Manchester coding than the NFC-B protocol.

The wireless transaction device 104A may include similar wireless communication capabilities as the electronic device 102A. For example the wireless transaction device 104A may include one or more antennas and/or transceivers for communicating with the electronic device 102A via one or more of an NFC-A protocol, an NFC-B protocol, an NFC-F protocol, a Bluetooth protocol, a Bluetooth low energy protocol, a Zigbee protocol, a Wi-Fi protocol, or generally any communication protocol. In one or more implementations, the wireless transaction device 104A may include a wireless reader, such as an NFC reader.

In one or more implementations, power may be supplied to the NFC controller 206 and the secure element 208 from a current induced by a wireless reader, such as an NFC reader, of the wireless transaction device 104A. Thus, in one or more implementations, the NFC controller 206 and the secure element 208 may present an express applet to the wireless transaction device 104A even when the electronic device 102A is unable to supply power to the NFC controller 206 and/or the secure element 208. In one or more implementations, the NFC controller 206 and the secure element 208 may be coupled to a supplemental power supply, such as a solar power supply and/or a solar charged power supply, that may provide power to the NFC controller 206 and/or the secure element 208 even when the main power supply of the electronic device 102A is low or otherwise unavailable.

In one or more implementations, the wireless transaction device 104A may transmit one or more polling signals, advertisement signals, discovery signals and/or broadcast signals, as is discussed further below with respect to FIGS. 10 and 11. The polling signals may include a polling frame, such as an enhanced polling frame that is discussed further below with respect to FIGS. 12 and 13. The polling frame may include a wireless transaction device group identifier, which may also be referred to as a terminal capabilities identifier (TCI). The polling signals may generally be used, for example, to initiate a wireless transaction with the electronic device 102A using an express applet that is accepted by the wireless transaction device 104A. For example, the express configuration applet may store an indication of the express applet to be used by the secure element 208 for each wireless transaction group device identifier.

For explanatory purposes, the electronic device 102A is illustrated in FIG. 2 as utilizing the NFC controller 206 to communicate with a wireless transaction terminal. However, the electronic device 102A may use any wireless communication controller and/or protocol to communicate with a wireless transaction terminal, such as Bluetooth, Bluetooth low energy, Wi-Fi, Zigbee, millimeter wave (mmWave), or generally any wireless communication controller and/or protocol.

The broker server 224 may communicate with the one or more service provider servers 120, such as for purposes of managing user authentication with the service provider, receiving updates/applets from the service provider to be applied to the secure element 208 of the electronic device 102A, and the like. The trusted services manager server 222 may communicate with the secure element 208 of the electronic device 102A via the network 106 and the host processor 202 to facilitate managing the applets 210A-N on the secure element 208. For example, the trusted services manager server 222 may transmit scripts to the secure element 208 for modifying/updating one or more of the applets 210A-N, and/or for provisioning new applets on the secure element 208.

The host processor 202 may include suitable logic, circuitry, and/or code that enable processing data and/or controlling operations of the electronic device 102A. In this regard, the host processor 202 may be enabled to provide control signals to various other components of the electronic device 102A. The host processor 202 may also control transfers of data between various portions of the electronic device 102A. Additionally, the host processor 202 may enable implementation of an operating system or otherwise execute code to manage operations of the electronic device 102A. The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

The host processor 202 may provide a passbook application 205 (or wallet application) that provides a graphical user interface to the user and also provides a logical interface to the applets 210A-N provisioned on the secure element 208. In one or more implementations, the passbook application 205 may determine the appropriate express applet for each wireless transaction device group identifier, such as based on user configured priorities and/or priorities received from the one or more service provider servers 120 (e.g., by way of the one or more wireless transaction system servers 110). An example process for determining the appropriate express applet for each of the wireless transaction device group identifiers is discussed further below with respect to FIG. 15.

The passbook application 205 may configure the express configuration applet 212 to store an indication of the appropriate express applet to select for each wireless transaction device group identifier. Thus, when a polling frame is received with a wireless transaction device group identifier, the express configuration applet 212 can select the appropriate one of the applets 210A-N without having to wake up or communicate with the host processor 202 (assuming authentication is not required). In one or more implementations, the express configuration applet 212 may be able to activate and deactivate express mode applets. Thus, the express configuration applet 212 may also have appropriate privileges to query the attributes of the installed applets 210A-N to determine which applets support the express mode.

In one or more implementations, one or more of the host processor 202, the memory 204, the NFC controller 206, the secure element 208, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
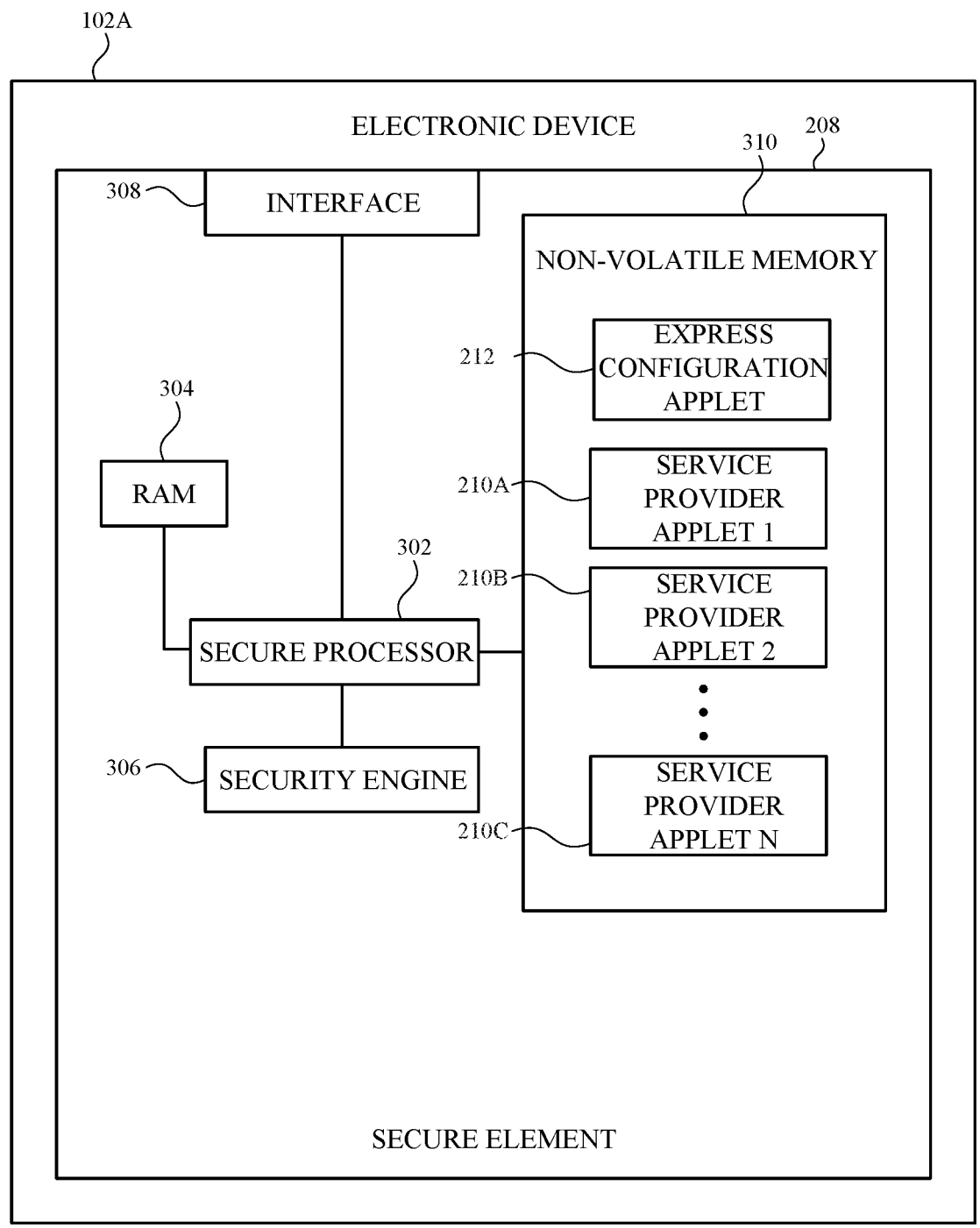
FIG. 3 illustrates an example electronic device including an example secure element that may be used in a scalable wireless transaction system in accordance with one or more implementations.

FIG. 3 illustrates an example electronic device 102A including an example secure element 208 that may be used in a scalable wireless transaction system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. For explanatory purposes, the secure element 208 is illustrated as being implemented in the electronic device 102A; however, the secure element 208 may be implemented in the electronic device 102B and/or any other electronic device.

The secure element 208 may include, among other components, a secure processor 302, RAM 304, a security engine 306, an interface 308, and non-volatile memory 310. The RAM 304 may include one or more of static RAM (SRAM) and/or dynamic RAM (DRAM). The interface 308 may communicatively couple the security element 208 to one or more other chips in the device, such as the NFC controller 206 and/or the host processor 202. The interface 308 may be, for example, a SWP interface, a universal serial bus (USB) interface, or generally any data interface. The secure processor 302 may be, for example, a reduced instruction set computing (RISC) processor, an advanced RISC machine (ARM) processor, or generally any processing circuitry.

The security engine 306 may perform one or more security operations for the secure element 208. For example, the security engine 306 may perform cryptographic operations and/or may manage cryptographic keys and/or certificates. In one or more implementations, the communications between the secure element 208 and an external device, such as the wireless transaction device 104A and/or the trusted services manager server 222 may be encrypted. For example, for NFC-F communications, an encryption key may be dynamically generated each time mutual authentication is performed. In these one or more implementations, the encryption/decryption and/or key generation/management may be performed all or in part by the security engine 306.

The non-volatile memory 310 may be and/or may include, for example, flash memory. The non-volatile memory 310 may store the attributes and executable code associated with the applets 210A-N, 212. In one or more implementations, the non-volatile memory 310 may also store firmware and/or operating system executable code that is executed by the secure processor 302 to provide the execution environment for the applets 210A-N, 212, such as a JAVA execution environment.

In one or more implementations, one or more of the secure processor 302, the RAM 304, the security engine 306, the interface 308, the non-volatile memory 310, and/or one or more portions thereof, may be implemented in software (e.g., subroutines and code), hardware (e.g., an ASIC, an FPGA, a PLD, a controller, a state machine, gated logic, discrete hardware components, or any other suitable devices) and/or a combination of both.

Figure 4:
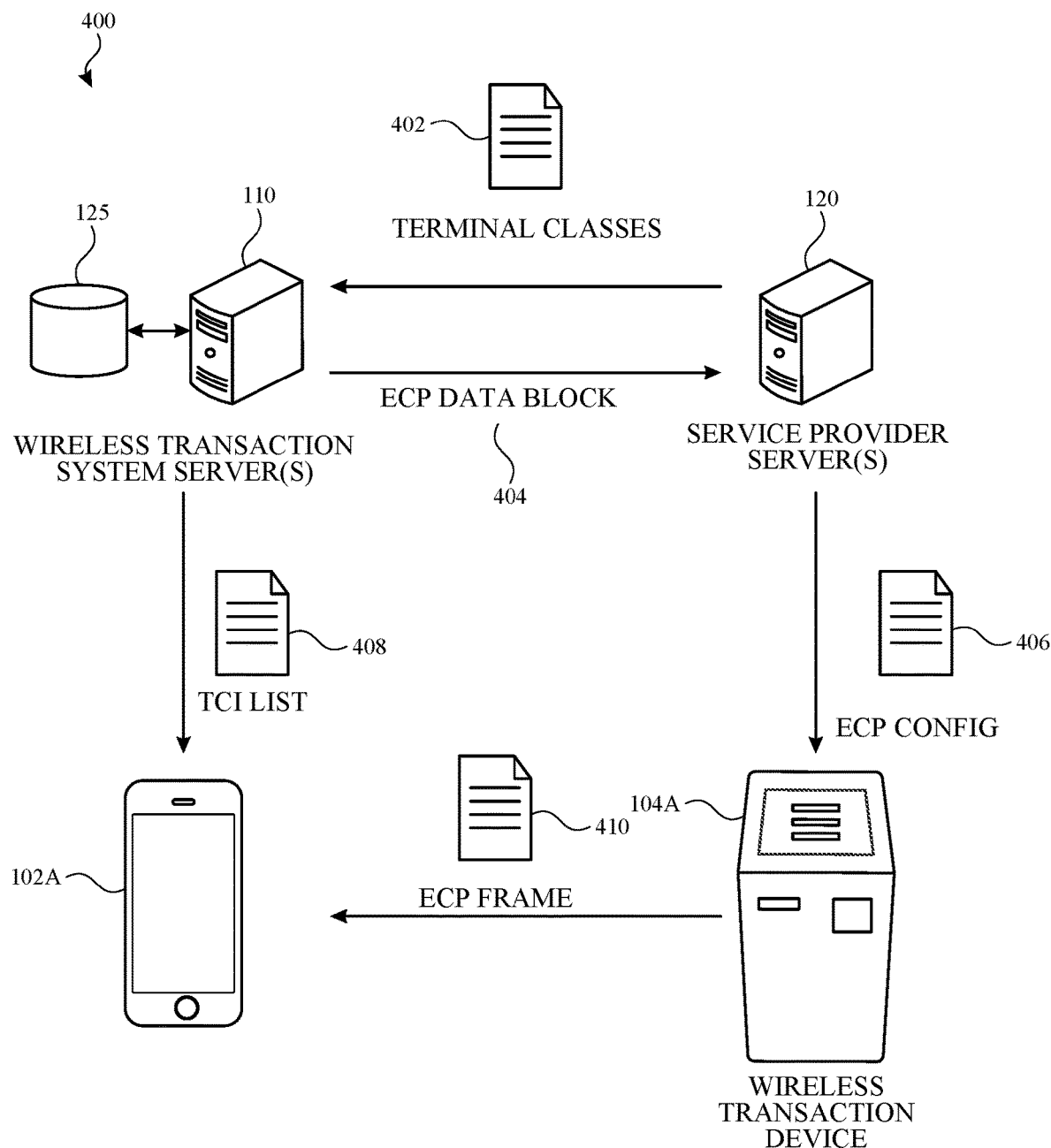
FIG. 4 illustrates an example data flow in a scalable wireless transaction system in accordance with one or more implementations.

FIG. 4 illustrates an example data flow 400 in a scalable wireless transaction system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The data flow 400 includes the one or more wireless transaction system servers 110, the service provider servers 120, the electronic device 102A and the wireless transaction device 104A. In the data flow 400, the service provider servers 120 represent multiple different servers associated with multiple different service providers, such as transit providers, credit/debit card account providers, access device providers, automotive/vehicle providers, university/institutional providers, and the like.

In one or more implementations, the data flow 400 begins when one or more of the service provider servers 120 provides a list of terminal classes 402 to the one or more wireless transaction system servers 110. For example, each service provider may group their respective wireless transaction devices into terminal classes, where a terminal class is a group of wireless transaction devices 104A-C that support or accept the same applets (and/or card types) and have the same applet prioritization scheme or the same priorities with respect to the applets. The list of terminal classes 402 may identify each of the terminal classes as well as the applets accepted/supported by each class, and the applet prioritization scheme of each class for a given service provider server 120.

The wireless transaction system server 110 receives the list of terminal classes 402 and assigns a wireless transaction group device identifier, which is also referred to as a terminal capabilities identifier (TCI), to each terminal class in the list of terminal classes 402. The wireless transaction system server 110 stores the received information in associated with the assigned TCI, such as in the wireless transaction system data store 125. The wireless transaction system server 110 transmits the assigned TCIs to the respective service provider servers 120, e.g. in enhanced contactless polling (ECP) data blocks 404.

The service provider servers 120 each receive the TCIs assigned to their terminal classes and configure an ECP frame, such as the ECP frame discussed below with respect to FIGS. 12 and 13, for each of the terminal classes, where the ECP frame includes the assigned TCI for the terminal class. The configured ECP frames and/or ECP information are transmitted, by the service provider servers 120, to the respective wireless transaction devices 104A-C in each respective terminal class as ECP configuration information 406.

The wireless transaction system server 110 also provides a TCI list 408 to each of the electronic devices 102A-C that utilize the wireless transaction system, such as the electronic device 102A in FIG. 4. The TCI list 408 includes the TCI assigned to each terminal class, the card types/applets supported/accepted by each terminal class, and the applet prioritization scheme for each terminal class. The electronic device 102A may store the received TCI list 408, such as in the memory 204 and/or in the secure element 208.

The electronic device 102A, such as via the passbook application 205, may process the TCI list 408, and any received user configured priorities, to identify an appropriate express applet for each TCI for which a corresponding applet is provisioned on the secure element 208. The passbook application 205 may then store an indication of the determined express applet for each TCI in the express configuration applet 212 of the secure element 208.

When the electronic device 102A detects the wireless transaction device 104A, the wireless transaction device 104A transmits an ECP frame 410 in the polling loop. The ECP frame 410 includes the TCI assigned to the wireless transaction device 104A. The electronic device 102A receives the ECP frame 410 and passes the ECP frame 410 to the secure element 208. The express configuration applet 212 on the secure element 208 selects the express applet associated with the TCI identifier included in the ECP frame 410, and presents the selected applet (e.g. via the NFC controller 206) to the wireless transaction device 104A to conduct the wireless transaction.

FIG. 5 illustrates an example format 500 of a wireless transaction device group identifier for wireless transaction devices included in and/or coupled to access devices in accordance with one or more implementations. Not all of the depicted fields and/or parameters may be used in all implementations, however, and one or more implementations may include additional or different fields and/or parameters than those shown in the figure. Variations in the arrangement and type of the fields and/or parameters may be made without departing from the spirit or scope of the claims as set forth herein. Additional, different, and/or fewer fields and/or parameters may be provided.

The format 500 is structured for use by different entities, such as campuses or universities, that utilize access devices that include and/or are coupled to wireless transaction devices, such as doors, locks, etc. In some implementations, the wireless transaction devices also can be configured to support, directly or indirectly, payment transactions, e.g., for cafeterias, cafés, campus stores, vending, events, etc. The format 500 includes two bytes for indicating the particular campus and a third byte for indicating information regarding the wireless transaction device group (e.g., terminal group), such as whether the group also accepts library cards, local transit cards, and the like. Thus, the format 500 is structured to reflect different campuses and specific acceptance groups (if any).

FIG. 6 illustrates an example format 600 of a wireless transaction device group identifier for wireless transaction devices included in and/or coupled to mobile and/or automotive devices in accordance with one or more implementations. Not all of the depicted fields and/or parameters may be used in all implementations, however, and one or more implementations may include additional or different fields and/or parameters than those shown in the figure. Variations in the arrangement and type of the fields and/or parameters may be made without departing from the spirit or scope of the claims as set forth herein. Additional, different, and/or fewer fields and/or parameters may be provided.

The format 600 is structured for use by different mobile and/or car manufacturers (or makers), and for each mobile and/or car manufacturer to differentiate reader identification information based on, for example, the purpose and/or location of the reader, such as a door-handle reader, dashboard reader, dashboard reader with wireless charging capability, trunk reader, and the like. The format 600 includes two bytes for indicating the particular manufacturer and a third byte for indicating the reader identification information. Thus, the format 600 is structured to reflect manufacturers, models, and reader types per mobile and/or automotive device.

FIG. 7 illustrates an example format 700 of a wireless transaction device group identifier for wireless transit transaction devices in accordance with one or more implementations. Not all of the depicted fields and/or parameters may be used in all implementations, however, and one or more implementations may include additional or different fields and/or parameters than those shown in the figure. Variations in the arrangement and type of the fields and/or parameters may be made without departing from the spirit or scope of the claims as set forth herein. Additional, different, and/or fewer fields and/or parameters may be provided.

The format 700 uses a dedicated TCI for open loop scheme combinations to define supported schemes. The format 700 includes three bytes dedicated to worldwide (or international schemes), and two bytes dedicated to local (or domestic) schemes. In one or more implementations, each scheme may correspond to a payment network that may be used to process wireless payment transactions. The international schemes may correspond to schemes that are accepted outside of the user's home country and the local schemes may refer to the schemes that are accepted in the user's home country but not necessarily elsewhere.

Since there may be many combinations of international schemes that are combined with a few local schemes for a given home country, three bytes are assigned to the international schemes in the example format 700, and two bytes are assigned to the local schemes. A given service provider may also reverse the placement of the international schemes and the local schemes in the example format 700, such as to cause a prioritization of the local schemes over the international schemes.

In general, the TCIs may be structured to allow a simpler ordering and insertion of new terminal capabilities for an existing service provider. For example, the last nibble of byte 6 can be used for terminal groups for one service provider, and TCIs can be assigned continuously within the number space of bytes 4 and 5, and the first nibble of byte 6. Furthermore when only open loop schemes are supported, then a particular TCI that indicates no closed loop support may be set in bytes 4-6. In one or more implementations, the coding scheme may assume that all accepted closed loop cards always have a higher priority than any accepted open loop card. For example, open loop transit may not need prioritization on the service provider side; e.g., the user may be able to set a priority or use the default priority list.

FIG. 8 illustrates example data structures 408, 802, 804 used in a scalable wireless transaction system in accordance with one or more implementations. Not all of the depicted fields and/or parameters may be used in all implementations, however, and one or more implementations may include additional or different fields and/or parameters than those shown in the figure. Variations in the arrangement and type of the fields and/or parameters may be made without departing from the spirit or scope of the claims as set forth herein. Additional, different, and/or fewer fields and/or parameters may be provided.

In FIG. 8, the TCI list 408 illustrates an example TCI list 408 that may be provided by the wireless transaction system server 110 to one or more of the electronic devices 102A-C. The TCI list 408 includes a column identifying each TCI (or wireless transaction device group identifier), e.g. TCI 1, TCI 2, and TCI 3, a column identifying the applets (identified by applet identifiers (AIDs)) accepted or supported by the wireless transaction devices in the wireless transaction device group, and a column indicating the service provider priority for each of the applets. The priority for each of the applets may be set by the service provider server 120 corresponding to the wireless transaction device group and/or by the wireless transaction system server 110.

The user configured priority list (UPL) 802 may indicate the priorities set by the user of the electronic device 102A for the applets 210A-N provisioned on the secure element 208 of the electronic device 102A and/or for other passes that are provisioned on the host processor 202 via the passbook application 205. The electronic device 102A may reconcile the priorities indicated in the TCI list 408 with the priorities indicated in the UPL 802 to determine an applet to associate with each of the TCIs corresponding to an applet provisioned on the secure element 208. For example, the priorities indicated in the UPL 802 may supersede any priorities indicated in the TCI list 408. An example process of reconciling priorities is discussed further below with respect to FIG. 15. The secure element express configuration data structure 804 is stored by the express configuration applet 212 and includes each TCI and the applet identifier of the applet determined to be associated with each TCI.

In this manner, when the secure element 208 receives an ECP frame with a TCI from a wireless transaction device 104A, the express configuration applet 212 can quickly and efficiently determine and present the appropriate applet for selection by the wireless transaction device 104A, such as via an explicit SELECT AID command.

FIG. 9 illustrates example secure element express configuration lists 900 in accordance with one or more implementations. Not all of the depicted fields and/or parameters may be used in all implementations, however, and one or more implementations may include additional or different fields and/or parameters than those shown in the figure. Variations in the arrangement and type of the fields and/or parameters may be made without departing from the spirit or scope of the claims as set forth herein. Additional, different, and/or fewer fields and/or parameters may be provided.

The example secure element express configuration lists 900 illustrates a data structure that may be stored by the express configuration applet 212 to quickly and efficiently determine the appropriate applet for a given ECP payload. The secure element express configuration lists 900 may include different lists for each type, subtype and/or TCI category, such as transit-standard-closed loop, transit-standard-open loop, access-standard, access-mobile (and/or access-automotive), access-campus, and the like.

When an ECP payload containing a TCI is received (such as from a wireless transaction device 104A), the express configuration applet 212 may verify that the ECP payload is in the correct format, may verify that value added services are not supported (which is discussed further below with respect to FIGS. 10 and 11), may verify that user authentication is not required, and may store the length of the ECP payload. The express configuration applet 212 may then choose one of the secure element express configuration lists 900 based on the third and fourth bytes in the ECP payload. The express configuration applet 212 may then examine bytes five through seven. For transit (closed loop) and access devices, the express configuration applet 212 confirms the stored payload length to a payload length stored in byte two of the payload, and determines whether the chosen one of the secure element express configuration lists 900 has at least one entry or is empty.

When the chosen one of the secure element express configuration lists 900 has at least one entry, the express configuration applet 212 searches the list for the TCI included in the received ECP payload. If a TCI is found, the express configuration applet 212 activates the applet corresponding to the TCI. If a TCI is not found and the list was a transit list (closed loop), the express configuration applet 212 checks if an open loop list exists. For bytes eight to twelve with respect to transit (open loop), the express configuration applet 212 determines whether the list has at least one entry or is empty. When the list has at least one entry, the express configuration applet 212 searches the list for a matching TCI. If a matching TCI is found, the express configuration applet 212 activates the applet corresponding to the TCI. If no matching TCI is found, then no transaction can occur.

In one or more implementations, when an ECP payload is received, there should be no non-express applets activated. If one or more non-express applets are activated, the express configuration applet 212 may coordinate with the passbook application 205 to reconcile the ambiguity. In one or more implementations, when an ECP payload is received and the electronic device 102A is pre-armed, the ECP payload is ignored. The pre-arming may be due to an error in the system as the NFC controller 206 should be set to field detect mode when express mode is disabled due to pre-arming.

Figure 10:
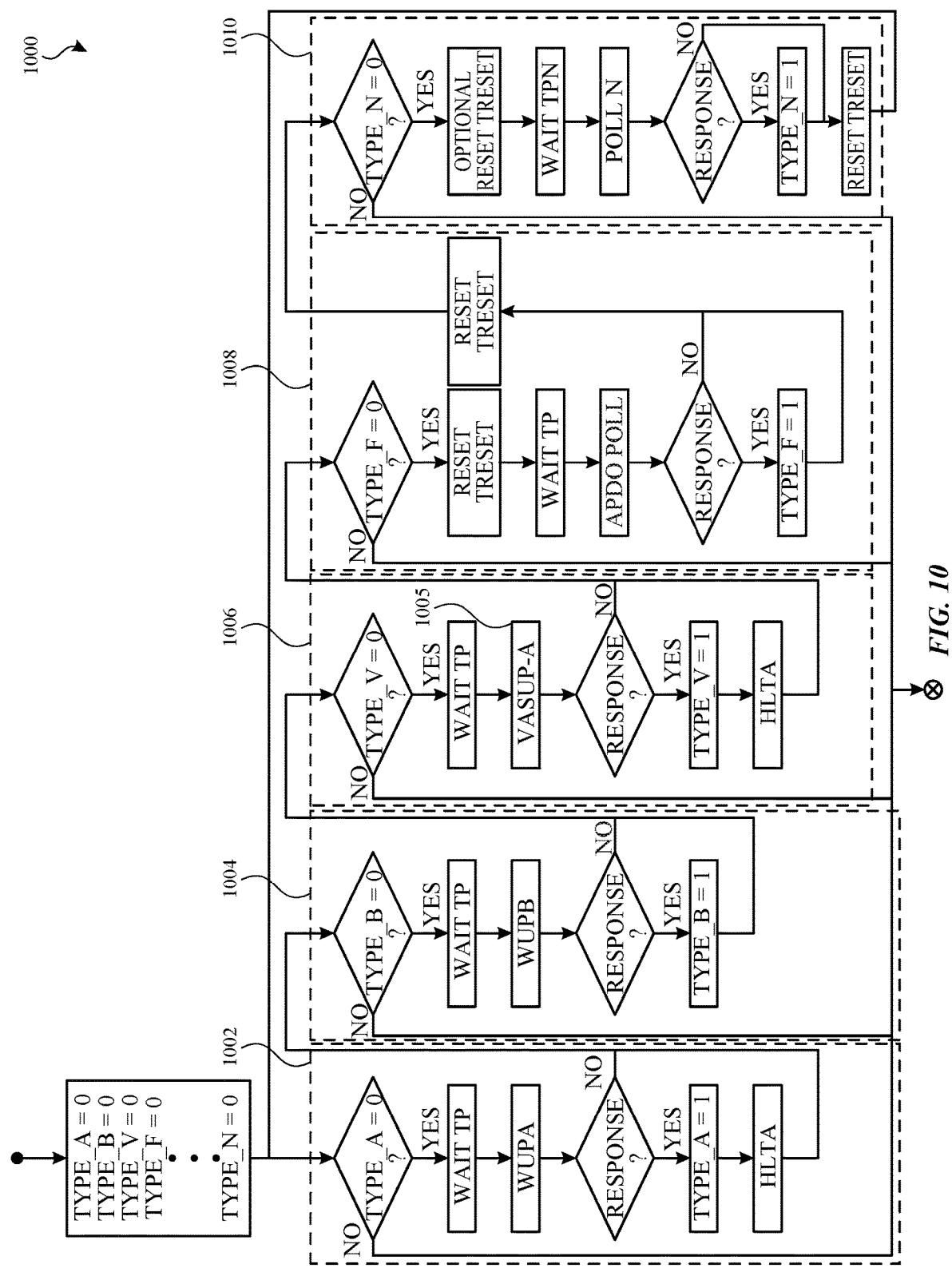
FIG. 10 illustrates an example polling loop in accordance with one or more implementations.

FIG. 10 illustrates an example polling loop 1000 in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The polling loop 1000 includes a type A polling sub-loop 1002, a type B polling sub-loop 1004, a type V (VAS) polling sub-loop 1006, a type F polling sub-loop 1008, and a type N polling sub-loop 1010. In one or more implementations, type N may refer to another technology other than type A, type B, type V, or type F, and may not be included. The wireless transaction devices 104A-C may transmit the ECP frame as the VASUP-A command 1005 in the type V polling sub-loop 1006. The ECP frame may be sent in type A modulation; however, the subject system may also support sending the ECP frame in types B and/or F. In one or more implementations, the electronic device 102A may poll type A, but not type B, and the polling loop 1000 may end after the type V polling sub-loop 1006.

The wireless transaction devices 104A-C may not expect any response from the electronic devices 102A-C after transmitting the ECP frame (as the VASUP-A command 1005). Only when the wireless transaction devices 104A-C are in VAS mode is a response to the VASUP-A command 1005 expected. If the electronic device 102A responds back with ATV-A to the VASUP-A command 1005, the wireless transaction device 104A may prioritize the VAS protocol application as the top and only priority for value added services applications installed on the wireless transaction device 104A. If the electronic device 102A responds back with regular ATQA to WUPA, the wireless transaction device 104A will still include the VAS protocol as part of the supported value added services applications installed on the wireless transaction device 104A. In one or more implementations, the wait times $t_p$ may be for example, between 5.1 milliseconds and 10 milliseconds, and the wait times may be different for two or more of the polling sub-loops.

The electronic device 102A may wait one whole polling loop 1000 before initiating the transaction in the subsequent type A polling sub-loop 1002. When the wireless transaction device 104A detects the card in type A, the wireless transaction device 104A may not send the HLTA command, but may immediately start the wireless transaction. Since the card is never halted, the wireless transaction device 104A may transmit a WUPA or a REQA command. In one or more implementations, the wireless transaction device 104A may comply with one or more EMV standards. For example, the contactless protocol parameters may be compliant with EMV requirements. Furthermore, the wireless transaction device 104A may not require that the electronic device 102A use a fixed unique identification (UID) code. Instead, a random UID may be accepted for privacy protection. In one or more implementations, there may be no field reset within or at the end of the polling loop 1000.

In one or more implementations, unattended, battery-powered wireless transaction devices (or reader devices) may use low power card detection. In this instance, the wireless transaction device may switch from low power card detection (LPCD) to NFC polling within 10 milliseconds (or any number of milliseconds) of when an electronic device presence is detected. In one or more implementations, the number of polling loops to be executed until the wireless transaction device goes back to LPCD should be at least five; however, the number may be dependent on the power budget of the wireless transaction device as well as the physical construction and placement.

Figure 11:
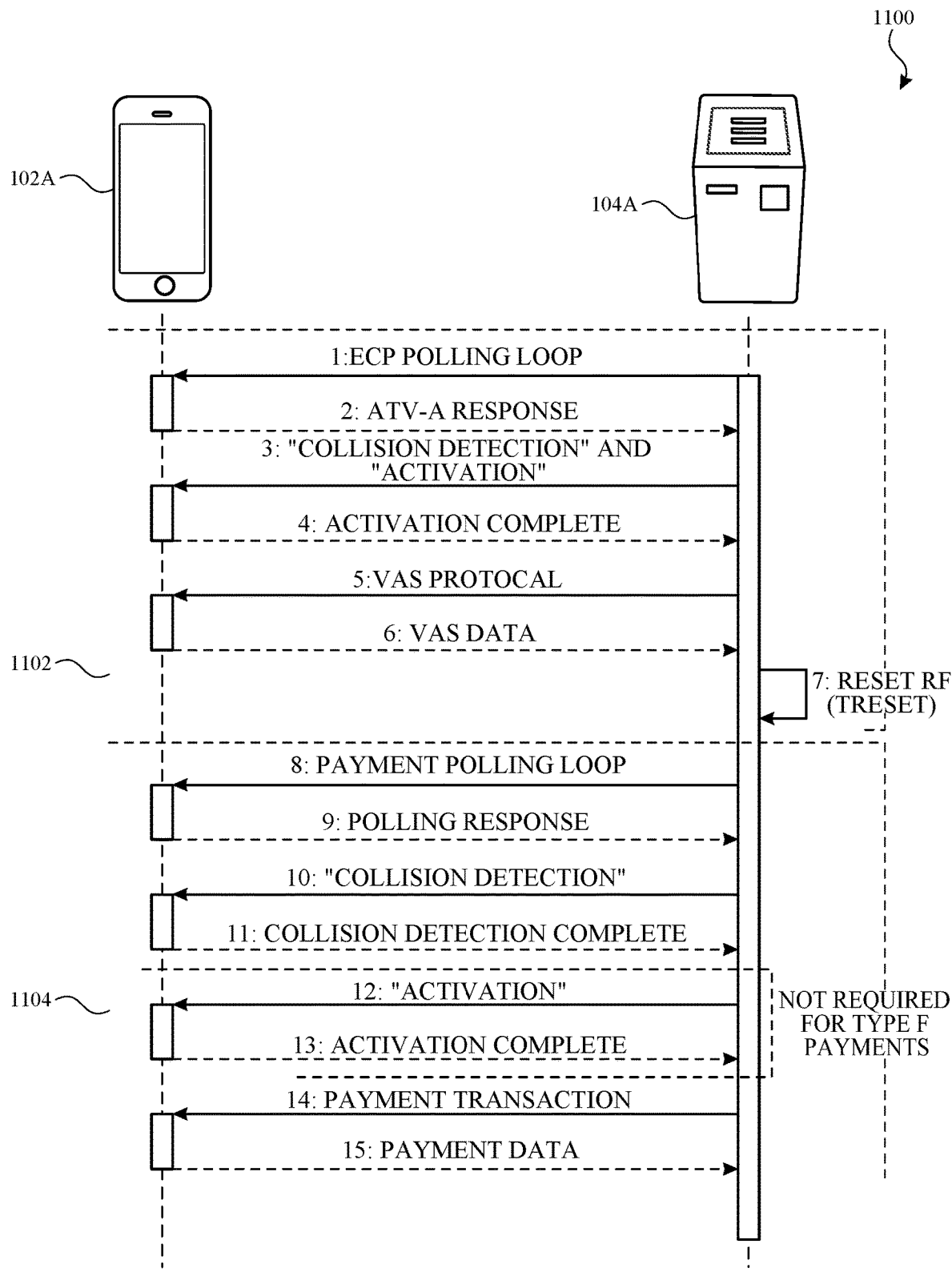
FIG. 11 illustrates an example communication flow when an enhanced contactless polling (ECP) frame is used in conjunction with a value added services (VAS) protocol in accordance with one or more implementations.

FIG. 11 illustrates an example communication flow 1100 when an enhanced contactless polling (ECP) frame is used in conjunction with the value added services (VAS) protocol in accordance with one or more implementations. Not all of the depicted components and/or operations may be used in all implementations, however, and one or more implementations may include additional or different components and/or operations than those shown in the figure. Variations in the arrangement and type of the components and/or operations may be made without departing from the spirit or scope of the claims as set forth herein. Additional components, different components, or fewer components may be provided.

In FIG. 11, the communication flow 1100 includes the electronic device 102A and the wireless transaction device 104A. In the polling loop 1102, the wireless transaction device 104A transmits the ECP frame as the VASUP-A command 1005. In the polling loop 1102, the electronic device 102A transmits the ATV-A Response frame to the wireless transaction device 104A, indicating that the electronic device 102A intends to utilize the VAS protocol. After sending ATV-A, the electronic device 102A may expect the wireless transaction device 104A to perform collision detection, activation, and exception processing for Type A as defined for payment applications, and after receiving ATV-A, the wireless transaction device 104A may follow collision detection, activation, and exception processing for Type A as defined for payment applications. Once the VAS protocol communications are complete, the wireless transaction device 104A resets its radio frequency (RF) circuitry.

The polling loop 1104 includes the communications for performing the payment transaction. or any particular wireless transaction that can be performed by the wireless transaction device 104A. For example, the electronic device 102A selects the applet associated with the TCI included in the ECP frame transmitted by the wireless transaction device 104A during the polling loop 1102, and the electronic device 102A presents the selected applet to the wireless transaction device 104A to perform the wireless transaction.

FIG. 12 illustrates an example enhanced contactless polling (ECP) frame format 1200 in accordance with one or more implementations. Not all of the depicted fields and/or parameters may be used in all implementations, however, and one or more implementations may include additional or different fields and/or parameters than those shown in the figure. Variations in the arrangement and type of the fields and/or parameters may be made without departing from the spirit or scope of the claims as set forth herein. Additional, different, and/or fewer fields and/or parameters may be provided.

The ECP frame format 1200 includes terminal info bytes, terminal subtype bytes, and then up to three TCI bytes. In one or more implementations, the ECP frame format 1200 may also include parity bits (not shown). In a basic configuration, an ECP frame may contain only one TCI; however, depending on the terminal class definition, there may be several different TCI values included. The ECP frame format 1200 may be a standard ISO 14443-3 frame with 8 bytes ('6A' and 7 data bytes), a start bit and a stop bit. The frame may be transmitted by the wireless transaction device 104A as a type A frame, a type B frame, a type F frame, or using any modulation.

FIG. 13 illustrates an example enhanced contactless polling frame format 1300 for wireless transaction devices included in and/or coupled to mobile and/or automotive devices in accordance with one or more implementations. Not all of the depicted fields and/or parameters may be used in all implementations, however, and one or more implementations may include additional or different fields and/or parameters than those shown in the figure. Variations in the arrangement and type of the fields and/or parameters may be made without departing from the spirit or scope of the claims as set forth herein. Additional, different, and/or fewer fields and/or parameters may be provided.

The ECP frame format 1300 for wireless transaction devices included in and/or coupled to mobile and/or automotive devices is similar to the ECP frame format 1200, except the parameters and fields are specific to mobile and/or automotive devices. For example the ECP frame format 1300 accounts for possible different wireless transaction devices in different locations in an automotive device, such as in the door handle, in the dashboard, etc.

Figure 14:
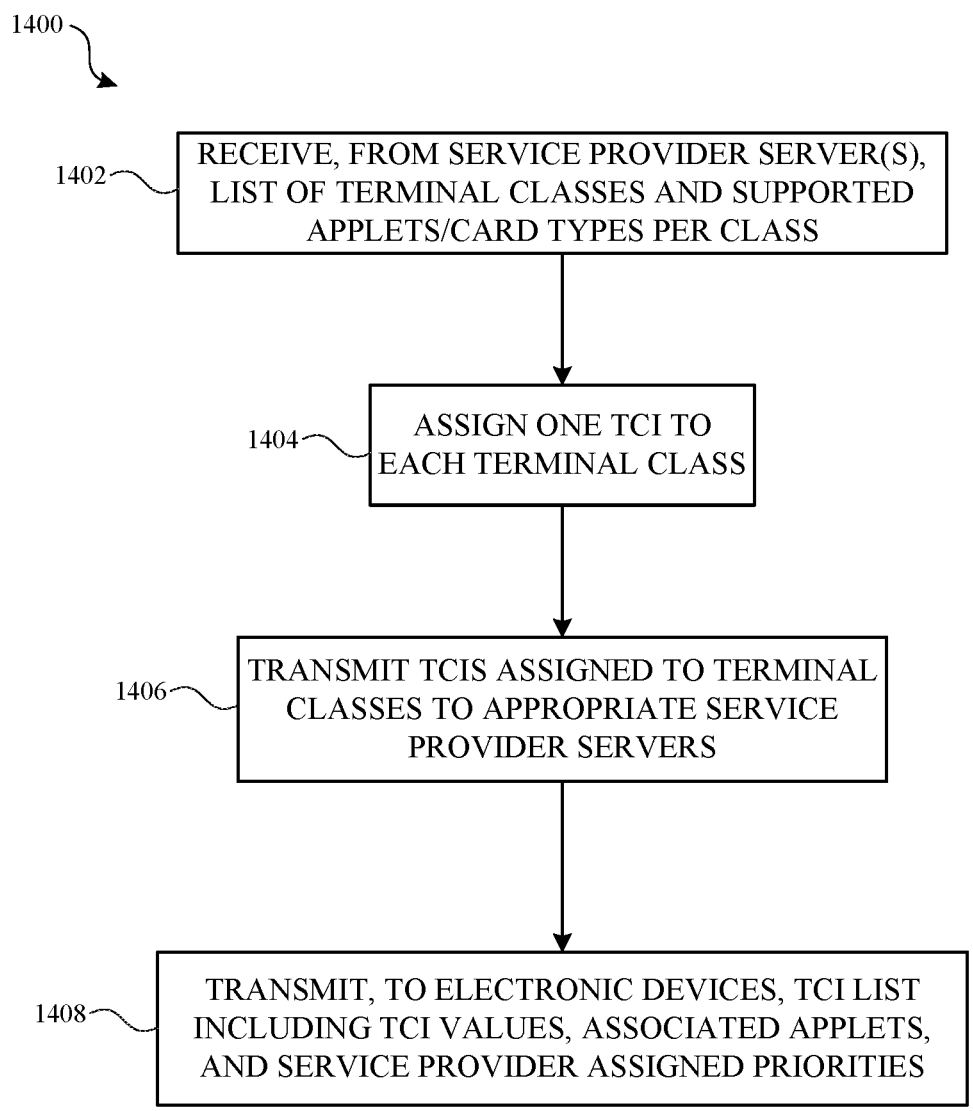
FIG. 14 illustrates a flow diagram of an example process of a wireless transaction system server for assigning and distributing wireless transaction device group identifiers in accordance with one or more implementations.

FIG. 14 illustrates a flow diagram of an example process 1400 of a wireless transaction system server 110 for assigning and distributing wireless transaction device group identifiers in accordance with one or more implementations. For explanatory purposes, the process 1400 is primarily described herein with reference to the wireless transaction system server 110 of FIG. 1. However, the process 1400 is not limited to the wireless transaction system server 110, and one or more operations of the process 1400 may be performed by one or more components of the wireless transaction system server 110. The wireless transaction system server 110 also is presented as an exemplary device and the operations described herein may be performed by any suitable device. For example, the process 1400 may be performed by the service provider server 120, or generally any electronic device and/or server. Further for explanatory purposes, the operations of the process 1400 are described herein as occurring in serial, or linearly. However, multiple operations of the process 1400 may occur in parallel. In addition, the operations of the process 1400 need not be performed in the order shown and/or one or more of the operations of the process 1400 need not be performed and/or can be replaced by other operations.

The process 1400 begins when the wireless transaction system server 110 receives, from one or more service provider servers 120, a list of terminal classes, supported applet/card types per class, and applet/card type prioritization schemes per class, if any (1402). For example, each service provider server 120 may provide the wireless transaction system server 110 with, for each terminal class, one or more of: a terminal group name (e.g. "Metro terminals"), the supported closed loop card types, e.g., the technology (A, B, F), the contactless parameters, the scheme type (e.g., DESFire, Plus, Calypso, ISO7816-4, MoC, MoT, etc.), the card types (e.g. Pioneer MoC, MoT, Oyster, Navigo, etc.), the supported open loop schemes (e.g., Visa, MasterCard, etc.), and the applet/card priorities (when multiple applets are supported), e.g. MoC before MoT, and/or whether all closed loop cards have a higher priority than all open loop cards, or vice-versa.

The service provider server 120 may also provide the wireless transaction system server 110 with the country, region, and/or city where the wireless transaction devices for a given terminal class are located. In addition, the service provider server 120 may also provide the card principle for a given terminal class (e.g., value on card, value on server, online, offline, etc.), and the transaction types (e.g., real online (thin client), deferred online (approval/decline online), offline (batch processing), etc.). The service provider server 120 may also provide the application domain for the terminal class (e.g., transmit, eMoney, access control, etc.), whether a more specific usage can be specified for the domain (e.g., hospitality within access control), and whether the terminal class accepts a different set of cards than other terminal classes (e.g., a train may also accept cards from a neighbor city).

The wireless transaction system server 110 stores all of the received information, such as in the wireless transaction system data store 125, and assigns one TCI to each terminal class (1404). In one or more implementations, even when only open loop schemes are supported by a given terminal class, the terminal class is still assigned a TCI. The wireless transaction system server 110 transmits, to the respective service provider servers 120, the assigned TCIs for the terminal classes and/or the ECP data block 404 to be embedded in the ECP frame for the wireless transaction devices in the terminal classes (1406).

The wireless transaction system server 110 also transmits, to the electronic devices 102A-C, a TCI list 408 that includes the assigned TCI values, the associated applets, and the service provider indicated priorities (1408). The list may include, for example, a given TCI, an internal AID (excluding the instance enumeration byte) of the highest priority applet as defined by the service provider (the applet can be open or closed loop), a second internal AID (excluding the instance enumeration byte) of the second highest priority applet as defined by the service provider (the second applet can also be open or closed loop), and additional AIDs if defined by the service provider. The order of the AIDs in the TCI list 408 may provide the service provider defined priority.

In one or more implementations, the wireless transaction system server 110 may transmit the TCI list 408 when the list is first created, and also when the TCI list 408 is updated and/or changed. The updates to the TCI list 408 may be performed by replacing the entire list and/or by sending the changed or added entries identified by the corresponding TCIs. If a changed entry does not include an AID, then the entry is removed from the TCI list 408. In one or more implementations, a secure mobile platform broker associated with the wireless transaction system server 110 may transmit the TCI list 408 to the electronic devices by pushing a JSON array.

Figure 15:
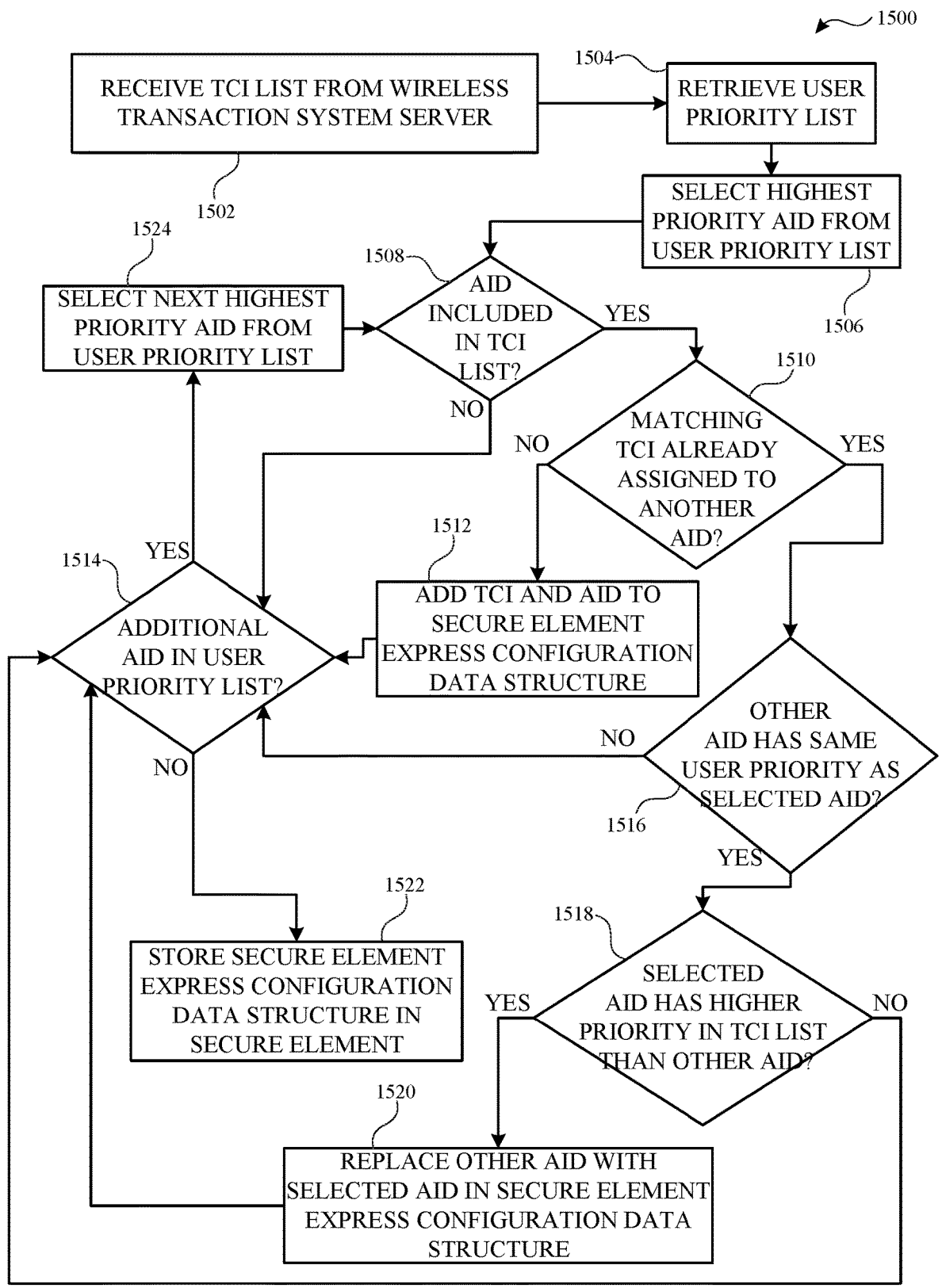
FIG. 15 illustrates a flow diagram of an example process of an electronic device for assigning applets to wireless transaction device group identifiers in accordance with one or more implementations.

FIG. 15 illustrates a flow diagram of an example process 1500 of an electronic device 102A for assigning applets to wireless transaction device group identifiers in accordance with one or more implementations. For explanatory purposes, the process 1500 is primarily described herein with reference to the host processor 202 and the secure element 208 of the electronic device 102A of FIGS. 1-2. However, the process 1500 is not limited to the host processor 202 or the secure element 208 of the electronic device 102A, and one or more operations of the process 1500 may be performed by one or more other components of the electronic device 102A and/or without using the host processor 202. The electronic device 102A also is presented as an exemplary device and the operations described herein may be performed by any suitable device. For example, the process 1500 may be performed by one or more of the electronic devices 102B-C, or generally any electronic device. Further for explanatory purposes, the operations of the process 1500 are described herein as occurring in serial, or linearly. However, multiple operations of the process 1500 may occur in parallel. In addition, the operations of the process 1500 need not be performed in the order shown and/or one or more of the operations of the process 1500 need not be performed and/or can be replaced by other operations.

The process 1500 begins when the electronic device 102A receives a TCI list 408 from the wireless transaction system server 110 (1502). The TCI list 408 includes the list of TCIs along with the associated applets and service provider configured priorities. In one or more implementations, the electronic device 102A may receive the TCI information corresponding to a particular service provider from a service provider server 120, e.g., when an applet is provisioned by the service provider server 120 on the secure element 208 of the electronic device 102A.

The electronic device 102A, such as via the passbook application 205, retrieves a user configured priority list (UPL) for the express applets provisioned on the secure element 208 (1504). The UPL may indicate a priority assigned by the user to each express applet (e.g. with reference to the AID) represented in the passbook application 205. If the user does not knowingly choose priorities, a user priority default list may be generated by assigning the highest priority to the applet that was provisioned first, where the default list can be subsequently modified by the user. In one or more implementations, if the user does not specify any priorities then all of the applets may be given the same priority.

The electronic device 102A selects the AID with the highest priority from the user priority list (1506). The electronic device 102A checks whether the selected AID is included in the received TCI list (1508). If the AID is not included in the received TCI list (1508), the electronic device 102A determines whether there are any additional AIDs in the user priority list (1514). If there are additional AIDs in the user priority list (1514), the electronic device 102A selects the next highest priority AID from the user priority list (1524) and checks whether the selected AID is included in the TCI list (1508).

If the selected AID is included in the TCI list (1508), the electronic device 102A determines whether the matching TCI is already assigned to another AID in the secure element express configuration data structure 804. If the matching TCI is not already assigned to another AID (1512), the electronic device 102A adds the TCI in association with the AID to the secure element express configuration data structure 804 (1512). If the matching TCI is already assigned to another AID (1510), the electronic device 102A determines whether the other AID already assigned to the TCI has the same user configured priority as the selected AID (1516). If the other AID has the same user configured priority as the selected AID (1516), the electronic device 102A determines whether the selected AID has a higher service provider configured priority in the TCI list than the other AID (1518).

If the selected AID has a higher service provider configured priority in the TCI list than the other AID (1518), the electronic device 102A replaces the other AID with the selected AID in the secure element express configuration data structure 804 (1520). When the electronic device 102A determines that there are no other AIDs in the user configured priority list 802 (1514), the electronic device 102A stores the secure element express configuration data structure 804 in the secure element 208, e.g. in conjunction with the express configuration applet 212 (1522). In one or more implementations, the secure element express configuration data structure 804 may be ordered starting with the lowest value TCI in increasing TCI value order. On reception of the secure element express configuration data structure 804, the express configuration applet 212 may confirm that the listed applets have express mode enabled. Any applet that does not have express mode enabled, e.g. any applet that requires user authentication, may be removed from the secure element express configuration data structure 804.

In one or more implementations, when the TCI list 408 is updated with new, modified or removed entries, a set of host side rules are applied. The rules are also triggered when an applet (and/or pass) is added or deleted from the electronic device 102A, as well as when other settings, such as express priorities, are applied. The host side rules may include selecting the applet with the highest user configured priority that matches the TCI. When the user does not specify a priority, then the service provider configured priorities included in the TCI list 408 are applied.

Figure 16:
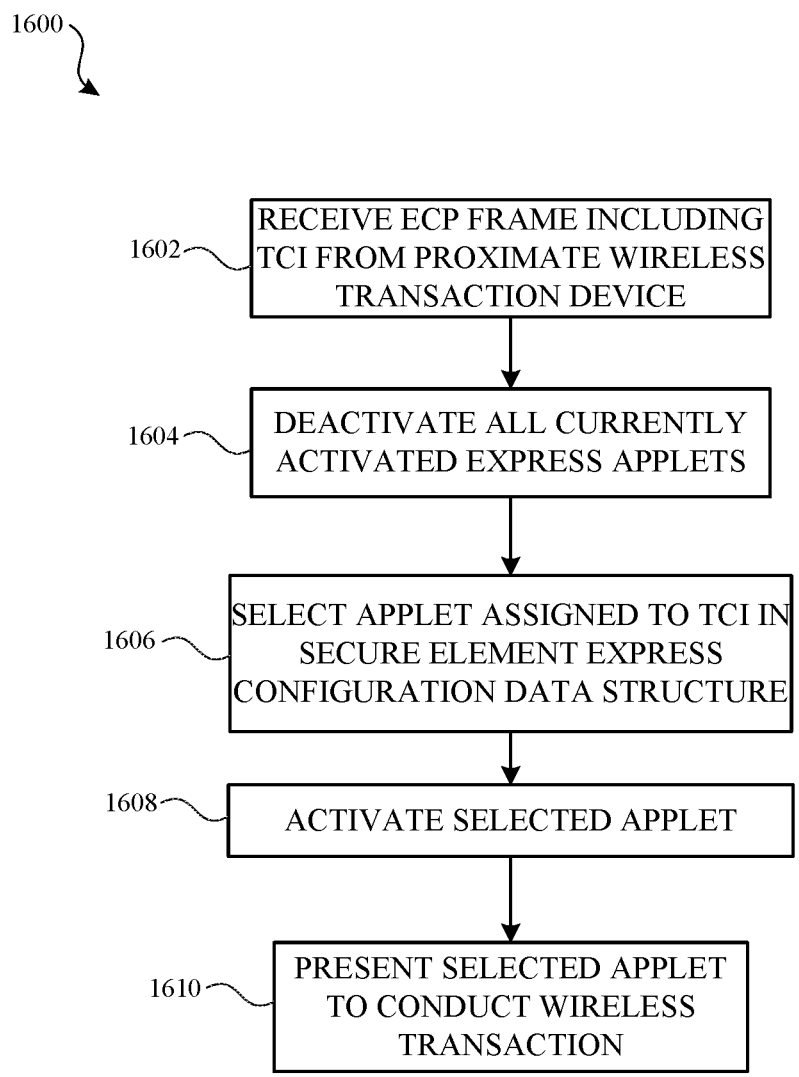
FIG. 16 illustrates a flow diagram of an example process for performing a wireless transaction in accordance with one or more implementations.

FIG. 16 illustrates a flow diagram of an example process 1600 for performing a wireless transaction in accordance with one or more implementations. For explanatory purposes, the process 1600 is primarily described herein with reference to the host processor 202 and the secure element 208 of the electronic device 102A of FIGS. 1-2. However, the process 1600 is not limited to the host processor 202 or the secure element 208 of the electronic device 102A, and one or more operations of the process 1600 may be performed by one or more other components of the electronic device 102A and/or without using the host processor 202. The electronic device 102A also is presented as an exemplary device and the operations described herein may be performed by any suitable device. For example, the process 1600 may be performed by the electronic device 102B, or generally any electronic device. Further for explanatory purposes, the operations of the process 1600 are described herein as occurring in serial, or linearly. However, multiple operations of the process 1600 may occur in parallel. In addition, the operations of the process 1600 need not be performed in the order shown and/or one or more of the operations of the process 1600 need not be performed and/or can be replaced by other operations.

The process 1600 begins when the electronic device 102A, e.g. via the NFC controller 206, receives an ECP frame (including a TCI) from a proximate wireless transaction device 104A (1602). The NFC controller 206 forwards the ECP frame and/or the ECP payload to the secure element 208. The NFC controller 206 may further indicate to the secure element 208 the NFC technologies supported by the wireless transaction device 104A, as well as whether user authentication has been requested by the wireless transaction device 104A for the wireless transaction.

The secure element 208 provides the ECP frame to the express configuration applet 212, which deactivates all activated applets (1604). The express configuration applet 212 selects the applet assigned to the TCI in the secure element express configuration data structure 804 (1606), and the express configuration applet 212 activates the selected applet (1608).

The secure element 208 then presents the selected applet to the wireless transaction device 104A to conduct the wireless transaction (1610). For example, the secure element 208 may provide the NFC controller 206 with the contactless parameters that correspond to the activated applet, and the NFC controller 206 may then apply the parameters to start card emulation. When the express configuration applet 212 cannot determine an eligible express applet to activate, the secure element 208 responds to the NFC controller 206 indicating that no express applet is available. The NFC controller 206 then may not enter virtual mode (e.g. may not start card emulation), and may instead send a field detect to the host processor 202 and/or may pass the ECP frame and/or TCI to the host processor 202.

When the ECP frame and/or TCI is passed to the host processor 202, the host processor 202 may select a matching express (or non-express) applet (e.g., if one exists) provisioned on the secure element based on the ECP frame (e.g., using the TCI or other content of the frame), may activate the express applet and request/perform user authentication. For example, when using the subject system at an ATM, authentication may be required.

In one or more implementations, the host processor 202 may select a matching NFC instrument hosted on the host processor 202 based on the ECP frame (e.g., using the TCI or other content of the frame), and activates the NFC instrument. The NFC instrument may or may not require user authentication. For example, NFC instruments hosted on the host processor 202 may include boarding passes for airplanes, tickets to concerts, and the like.

When the wireless transaction device 104A requests that user authentication be performed before the wireless transaction is conducted, the NFC controller 206 may send the field detect to the passbook application 205 along with the AID of the applet selected for the wireless transaction. The passbook application 205 may then initiate the user authentication. This mechanism may be secure when the applet securely indicates to the wireless transaction device 104A that it has been authenticated.

Figure 17:
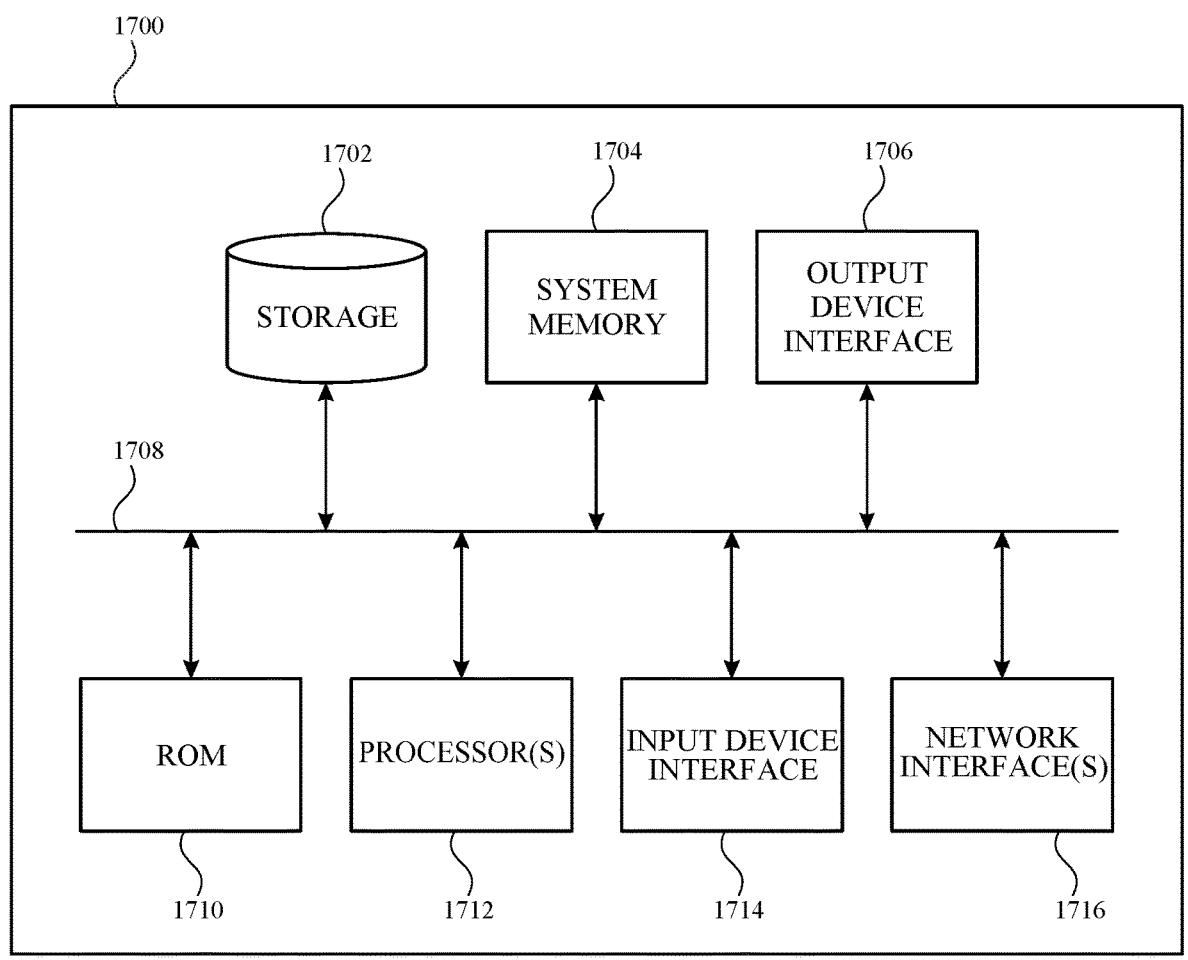
FIG. 17 illustrates an example electronic system with which aspects of the subject technology may be implemented in accordance with one or more implementations.

FIG. 17 illustrates an example electronic system 1700 with which aspects of the subject technology may be implemented in accordance with one or more implementations. The electronic system 1700 can be, and/or can be a part of, one or more of the electronic devices 102A-B, one or more of the wireless transaction devices 104A-C, and/or one or more of the servers 110, 120 shown in FIG. 1. The electronic system 1700 may include various types of computer readable media and interfaces for various other types of computer readable media. The electronic system 1700 includes a bus 1708, one or more processing unit(s) 1712, a system memory 1704 (and/or buffer), a ROM 1710, a permanent storage device 1702, an input device interface 1714, an output device interface 1706, and one or more network interfaces 1716, or subsets and variations thereof.

The bus 1708 collectively represents all system, peripheral, and chipset buses that communicatively connect the numerous internal devices of the electronic system 1700. In one or more implementations, the bus 1708 communicatively connects the one or more processing unit(s) 1712 with the ROM 1710, the system memory 1704, and the permanent storage device 1702. From these various memory units, the one or more processing unit(s) 1712 retrieves instructions to execute and data to process in order to execute the processes of the subject disclosure. The one or more processing unit(s) 1712 can be a single processor or a multi-core processor in different implementations.

The ROM 1710 stores static data and instructions that are needed by the one or more processing unit(s) 1712 and other modules of the electronic system 1700. The permanent storage device 1702, on the other hand, may be a read-and-write memory device. The permanent storage device 1702 may be a non-volatile memory unit that stores instructions and data even when the electronic system 1700 is off. In one or more implementations, a mass-storage device (such as a magnetic or optical disk and its corresponding disk drive) may be used as the permanent storage device 1702.

In one or more implementations, a removable storage device (such as a floppy disk, flash drive, and its corresponding disk drive) may be used as the permanent storage device 1702. Like the permanent storage device 1702, the system memory 1704 may be a read-and-write memory device. However, unlike the permanent storage device 1702, the system memory 1704 may be a volatile read-and-write memory, such as random access memory. The system memory 1704 may store any of the instructions and data that one or more processing unit(s) 1712 may need at runtime. In one or more implementations, the processes of the subject disclosure are stored in the system memory 1704, the permanent storage device 1702, and/or the ROM 1710. From these various memory units, the one or more processing unit(s) 1712 retrieves instructions to execute and data to process in order to execute the processes of one or more implementations.

The bus 1708 also connects to the input and output device interfaces 1714 and 1706. The input device interface 1714 enables a user to communicate information and select commands to the electronic system 1700. Input devices that may be used with the input device interface 1714 may include, for example, alphanumeric keyboards and pointing devices (also called "cursor control devices"). The output device interface 1706 may enable, for example, the display of images generated by electronic system 1700. Output devices that may be used with the output device interface 1706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 17, the bus 1708 also couples the electronic system 1700 to one or more networks and/or to one or more network nodes, such as the electronic devices 102A-F shown in FIG. 1, through the one or more network interface(s) 1716. In this manner, the electronic system 1700 can be a part of a network of computers (such as a LAN, a wide area network ("WAN"), or an Intranet, or a network of networks, such as the Internet. Any or all components of the electronic system 1700 can be used in conjunction with the subject disclosure.

As described above, aspects of the present technology may include the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include financial data, demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
   a device secure element;
   a memory; and
   at least one processor configured to:
   receive, from a wireless transaction device, a polling frame that includes a wireless transaction device group identifier;
   upon receipt of the polling frame, deactivate each applet provisioned on the device secure element;
   select an applet provisioned on the device secure element based at least in part on the wireless transaction device group identifier and an indication, stored on the device secure element, of an assigned applet to be used with the wireless transaction device group identifier;
   upon selection of the applet, activate the selected applet; and
   utilize the selected activated applet to perform a wireless transaction with the wireless transaction device without requesting user authentication.

2. The device of claim 1, wherein the at least one processor is further configured to:
   receive, from a wireless transaction system server and prior to receiving the polling frame, a list of applets that are associated with the wireless transaction device group identifier, the list of applets comprising the applet; and
   assign the applet to the wireless transaction device group identifier based at least in part on a user configurable priority associated with the applet relative to other applets provisioned on the device secure element.

3. The device of claim 2, wherein the at least one processor is configured to assign the applet to the wireless transaction device group identifier based at least in part on the user configurable priority and a priority indicated in the received list of applets.

4. The device of claim 3, wherein the user configurable priority supersedes the priority indicated in the received list of applets.

5. The device of claim 2, wherein the wireless transaction device group identifier identifies the wireless transaction device as being part of a group of wireless transaction devices that support the listed applets for wireless transactions.

6. The device of claim 1, wherein the wireless transaction device comprises an access device.

7. The device of claim 1, wherein the at least one processor is further configured to:
   wait a full polling loop before utilizing the selected activated applet to perform the wireless transaction with the wireless transaction device.

8. A system comprising:
   a secure element configured to store wireless transaction device group identifiers and, for each wireless transaction device group identifier, an indication of an assigned applet;
   at least one processor configured to:
   receive, from a mobile transaction system server, a list of wireless transaction device group identifiers, the list indicating at least one applet associated with each of the wireless transaction device group identifiers;
   obtain a user priority list, the user priority list indicating a user configured priority for one or more applets of a plurality of applets provisioned on a device secure element;
   for each respective wireless transaction device group identifier in the list of wireless transaction group device identifiers, assign one of the plurality of applets that matches the at least one applet associated with the respective wireless transaction device group identifier, the one of the plurality of applets having a highest user configured priority relative to other applets in the one or more applets in the user priority list;
   store on the secure element, for reach respective wireless transaction device group identifier in the list of wireless transaction group device identifiers, an indication of the assigned one of the plurality of applets;
   receive, from a wireless transaction device, a polling frame that includes one of the wireless transaction device group identifiers;
   select the one of the plurality of applets assigned to the one of the wireless transaction device group identifiers; and
   conduct a wireless transaction with the wireless transaction device using the selected one of the plurality of applets without requesting user authentication.

9. The system of claim 8, wherein the wireless transaction device comprises an access device.

10. The system of claim 8, wherein the list of wireless transaction device group identifiers further indicates a service provider priority of the at least one applet associated with each of the wireless transaction device group identifiers.

11. The system of claim 10, wherein the one of the plurality of applets assigned to the respective wireless transaction device group identifier has a same user configured priority as another applet of the plurality of applets that matches the at least one applet associated with the respective wireless transaction device group identifier, and the one of the plurality of applets has a higher service provider priority than the other applet of the plurality of applets.

12. The system of claim 8, wherein the wireless transaction is conducted without requesting user authentication.

13. The system of claim 8, wherein the at least one processor is further configured to:
    upon receipt of the polling frame, deactivate each of the plurality of applets provisioned on the device secure element; and
    upon selection of the one of the plurality of applets, activate the selected one of the plurality of applets.

14. The system of claim 13, wherein the at least one processor is further configured to:

wait a full polling loop before utilizing the selected one of the plurality of applets to perform the wireless transaction with the wireless transaction device.

15. A method comprising:
at an electronic device comprising a device secure element, a memory and at least one processor:
receiving, from a wireless transaction device, a polling frame that includes a wireless transaction device group identifier;
upon receiving the polling frame, deactivating each applet provisioned on the device secure element;
selecting an applet provisioned on the device secure element based at least in part on the wireless transaction device group identifier and an indication, stored on the device secure element, of an assigned applet to be used with the wireless transaction device group identifier;
upon selecting the applet, activating the selected applet; and
utilizing the selected activated applet to perform a wireless transaction with the wireless transaction device without requesting user authentication.

16. The method of claim 15, wherein the method further comprises:
at the electronic device:
receiving, from a wireless transaction system server and prior to receiving the polling frame, a list of applets that are associated with the wireless transaction device group identifier, the list of applets comprising the applet; and
assigning the applet to the wireless transaction device group identifier based at least in part on a user configurable priority associated with the applet relative to other applets provisioned on the device secure element.

17. The method of claim 16, wherein assigning the applet to the wireless transaction device group identifier further comprises assigning the applet to the wireless transaction device group identifier based at least in part on the user configurable priority and a priority indicated in the received list of applets.

18. The method of claim 17, wherein the user configurable priority supersedes the priority indicated in the received list of applets.

19. The method of claim 16, wherein the wireless transaction device group identifier identifies the wireless transaction device as being part of a group of wireless transaction devices that support the listed applets for wireless transactions.

20. The method of claim 15, wherein the wireless transaction device comprises an access device.

* * * * *